United States Patent
Mu

(10) Patent No.: US 12,500,686 B2
(45) Date of Patent: Dec. 16, 2025

(54) DATA TRANSMISSION METHOD AND APPARATUS, AND COMPUTER-READABLE STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 608 days.

(21) Appl. No.: 17/909,137

(22) PCT Filed: Mar. 6, 2020

(86) PCT No.: PCT/CN2020/078303
§ 371 (c)(1),
(2) Date: Sep. 2, 2022

(87) PCT Pub. No.: WO2021/174552
PCT Pub. Date: Sep. 10, 2021

(65) Prior Publication Data
US 2023/0100666 A1    Mar. 30, 2023

(51) Int. Cl.
*H04L 1/00* (2006.01)
*H04W 74/08* (2024.01)
*H04W 74/0833* (2024.01)

(52) U.S. Cl.
CPC ....... *H04L 1/0003* (2013.01); *H04W 74/0833* (2013.01)

(58) Field of Classification Search
CPC ... H04L 1/0003; H04L 1/0009; H04L 1/0016; H04L 1/0004; H04L 5/0046;
(Continued)

(56) References Cited

U.S. PATENT DOCUMENTS

| 8,780,884 B2 | 7/2014 | Choi et al. |
| 10,638,378 B2 | 4/2020 | Nagaraja et al. |

(Continued)

FOREIGN PATENT DOCUMENTS

| CN | 106792497 A | 5/2017 |
| CN | 109586878 A | 4/2019 |

(Continued)

OTHER PUBLICATIONS

ISA State Intellectual Property Office of the People's Republic of China, Written Opinion of the International Searching Authority Issued in Application No. PCT/CN2020/078303, Sep. 23, 2020, WIPO, 9 pages.

(Continued)

*Primary Examiner* — Candal Elpenord
(74) *Attorney, Agent, or Firm* — Volpe Koenig

(57) ABSTRACT

A data transmission method includes that a transmitter sends a random access request by using a first random access resource. The transmitter supports a first modulation scheme and a second modulation scheme, the second modulation scheme includes a high-order modulation scheme whose modulation order is higher than the modulation order of the first modulation scheme, and the first random access resource is configured to the transmitter supporting the second modulation scheme. The method further includes that the transmitter performs a data modulation in accordance with a target modulation scheme. The modulation is performed under a direction of a received random access response, and the target modulation scheme is one of the first modulation scheme and the second modulation scheme.

20 Claims, 9 Drawing Sheets

(58) Field of Classification Search
CPC ............ H04L 5/0078; H04W 74/0833; H04W 74/0866; H04W 74/006; Y02D 30/70
USPC .................................................. 370/329–330
See application file for complete search history.

(56) References Cited

U.S. PATENT DOCUMENTS

| | | | |
|---|---|---|---|
| 2014/0198677 A1* | 7/2014 | Xu ........................ | H04L 1/0026 370/252 |
| 2015/0092681 A1* | 4/2015 | Fernando .............. | H04L 1/0003 370/329 |
| 2018/0160453 A1 | 6/2018 | Lee et al. | |
| 2018/0324653 A1 | 11/2018 | Nagaraja et al. | |
| 2019/0045554 A1* | 2/2019 | Ye ......................... | H04L 5/0007 |
| 2019/0159197 A1* | 5/2019 | Shrestha ............ | H04W 74/0866 |
| 2019/0159257 A1* | 5/2019 | Rico Alvarino ...... | H04L 1/0003 |
| 2019/0215872 A1 | 7/2019 | Park et al. | |
| 2020/0059390 A1* | 2/2020 | Zhang ................... | H04L 5/0092 |
| 2020/0245372 A1* | 7/2020 | Lei ................... | H04W 74/0833 |
| 2020/0252967 A1* | 8/2020 | Ozturk ............. | H04W 74/0808 |
| 2022/0167428 A1 | 5/2022 | Mu | |

FOREIGN PATENT DOCUMENTS

| | | |
|---|---|---|
| CN | 109756991 A | 5/2019 |
| CN | 110495192 A | 11/2019 |
| CN | 110583090 A | 12/2019 |

OTHER PUBLICATIONS

MediaTek Inc., "Early Data Transmission TBS Determination", 3GPP TSG RAN WG2 Meeting #101, Athens, Greece, Feb. 26-Mar. 2, 2018, Agenda Item: 9.14.2, 9.13.2, R2-1802603, 6 pages.

Interdigital, "Remaining open issues related to Random Access", 3GPP TSG-RAN WG2 #92, Anaheim, US Nov. 16-20, 2015, R2-156622, 4 pages.

ISA State Intellectual Property Office of the People's Republic of China, International Search Report Issued in Application No. PCT/CN2020/078303, Sep. 23, 2020, WIPO, 4 pages.

* cited by examiner

DATA TRANSMISSION METHOD AND APPARATUS, AND COMPUTER-READABLE STORAGE MEDIUM

CROSS-REFERENCE TO RELATED APPLICATION

This application is the U.S. national phase application of International Application No. PCT/CN2020/078303, filed on Mar. 6, 2020, the disclosure of which is incorporated herein by reference in its entirety for all purposes.

BACKGROUND

Early data transmission (EDT) means that a terminal transmits data to an access network device during a random access procedure, which can effectively reduce the power consumption of the terminal and improve the efficiency of the data transmission, especially for the terminal which generally has a small data transmission amount, such as a Machine Type Communication (MTC) device and a Narrow Band Internet of Thing (NB-IoT) device.

A procedure of the early data transmission includes that the terminal sends Message 1 (i.e., a random access request) to the access network device, the access network device sends Message 2 (i.e., a random access response) to the terminal, and the terminal transmits the data to the access network device in Message 3 (MSG3) after receiving the random access response.

SUMMARY

According to a first aspect of the embodiments of the present disclosure, a data transmission method is provided. The method includes: sending, by a transmitter, a random access request by using a first random access resource, where the transmitter supports a first modulation scheme and a second modulation scheme, the second modulation scheme includes a high-order modulation scheme whose modulation order is higher than the modulation order of the first modulation scheme, and the first random access resource is configured to the transmitter supporting the second modulation scheme; performing, by the transmitter, a data modulation in accordance with a target modulation scheme, where the modulation is performed under a direction of a received random access response, and the target modulation scheme is one of the first modulation scheme and the second modulation scheme; and transmitting, by the transmitter, modulated data to a receiver.

According to a second aspect of the embodiments of the present disclosure, a data transmission method is provided. The method includes: receiving, by a receiver, a random access request; determining, by the receiver, a target modulation scheme based on a random access resource used by the random access request, where the target modulation scheme is one of a first modulation scheme and a second modulation scheme, and the second modulation scheme includes a higher-order modulation scheme whose modulation order is higher than the modulation order of the first modulation scheme; and sending, by the receiver, the random access response generated based on the target modulation scheme; and receiving, by the receiver, modulated data.

According to a third aspect of the embodiments of the present disclosure, a data transmission apparatus is provided. The apparatus includes: one or more processors; and a memory for storing executable instructions for the one or more processors; where the one or more processors are configured to load and execute the executable instructions to implement the data transmission method provided in the foregoing first aspect.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
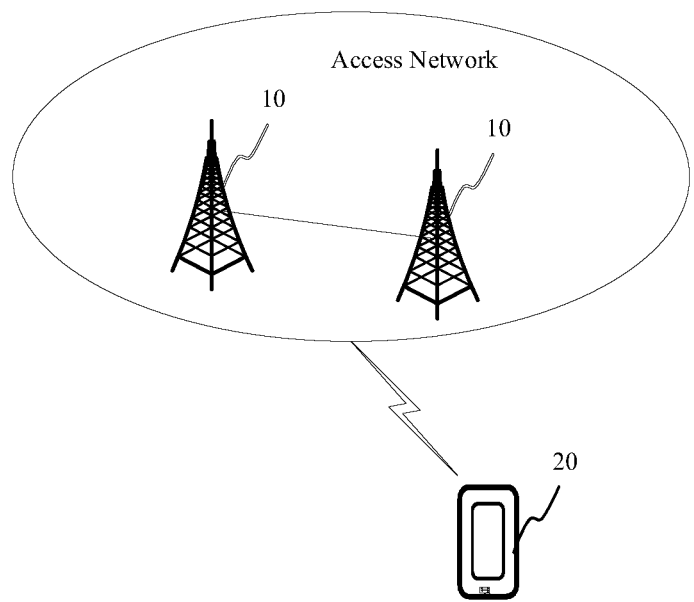
FIG. 1 illustrates a block diagram of a communication system provided by an example of the present disclosure.

Embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a" and "the" in their singular forms in the examples and the appended claims of the present disclosure are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like another example may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when", "upon", or "in response to determining".

It should be understood that, although steps are described in the examples of the present disclosure with being numbered for ease of understanding, these numbers neither represent an execution order of these steps, nor mean that these steps numbered sequentially have to be executed together. It should be understood that one or several of multiple steps numbered sequentially may be executed separately to solve a corresponding technical problem and implement a predetermined technical solution. Even if a plurality of steps are listed together illustrated in the accompanying drawings, it does not mean that these steps have to be performed together. These steps are illustrated and listed together in the accompanying drawings only for being easily understood.

FIG. 1 illustrates a block diagram of a communication system provided by an example of the present disclosure. As illustrated in FIG. 1, the mobile communication system may include: one or more access network devices 10 and one or more terminals 20.

The access network device 10 is deployed in a wireless access network to provide the terminals 20 with a wireless access function. The access network device may be a base station (BS). The access network device 10 may communicate with the terminal 20 in wireless way via one or more antennas. The access network device 10 may provide communication coverage for its geographic area. The base station may appear in different types, such as a macro base station, a micro base station, a relay station, and an access point. In some examples, the base station may be referred to by those skilled in the art as a base station transceiver, a wireless base station, an access point, a wireless transceiver, a basic service set (BSS), an extended service set (ESS), a NodeB, an evolved NodeB (eNB or eNodeB) or some other appropriate terms. In one or more examples, the base station is called gNB in a 5G system. For ease of description, the above devices for providing the wireless communication function for the terminals 20 are collectively called the access network devices in the examples of the present disclosure.

The terminals 20 may be distributed in the whole mobile communication system, and each terminal 20 may be stationary or moving. The terminal 20 may also be referred to by those skilled in the art as a mobile station, a user station, a mobile unit, a user unit, a wireless unit, a remote unit, a mobile device, user equipment, a wireless device, a wireless communication device, a remote device, a mobile user station, an access terminal, a mobile terminal, a wireless terminal, a remote terminal, a handheld device, a user agent, a mobile client, a client or some other appropriate terms. The terminal 20 may be a cellular phone, a personal digital assistant (PDA), a wireless modem, a wireless communication device, a handled device, a tablet computer, a laptop computer, a cordless phone, a wireless local loop (WLL) station, etc. The terminal 20 may communicate with the access network device 10 in the mobile communication system.

The access network device 10 and the terminal 20 may communicate with each other through air interface technologies, for example, through a cellular technology. The communication links between the access network device 10 and the terminal 20 may include: a downlink (DL) transmission from the access network device 10 to the terminal 20, and/or, an uplink (UP) transmission from the terminal 20 to the access network device 10. The downlink transmission may also be called a forward link transmission, and the uplink transmission may also be called a reverse link transmission. In some examples, the downlink transmission may include a transmission of to-be-detected signals. The to-be-detected signals may include reference signals and/or synchronization signals.

The above mobile communication system illustrated in FIG. 1 may be a Long Term Evolution (LTE) system, a next-generation evolution system based on the LTE system such as an LTE-Advanced (LTE-A) system or a 5th Generation (5G) system (also called an NR system), a next-generation evolution system based on the 5G system, or the like. In the examples of the present disclosure, the terms "system" and "network" are often used interchangeably, but those skilled in the art can understand their meanings.

In one or more examples, the communication system may be an Internet of Things (IoT) system, and the terminal may be a Machine Type Communication (MTC) device or a narrowband IoT (NB-IoT) device. The IoT system is widely applied in smart cities (e.g., reading meter), smart agriculture (e.g., collecting information such as temperature and humidity), smart transportation (e.g., shared bicycles), and many other fields.

The communication system and the business scenarios described in the examples of the present disclosure are intended to more clearly illustrate the technical solutions of the examples of the present disclosure, and do not constitute any limitation to the technical solutions provided by the examples of the present disclosure. Those of ordinary skill in the art will know that the technical solutions provided in the examples of the present disclosure are also applicable to similar technical problems which occur with the communication system evolving and new business scenarios emerging.

In related arts, a type of terminal has been developed to support both a high-order modulation technology and a low-order modulation technology. The high-order modulation technology is introduced to increase a data transmission amount without expanding a transmission bandwidth. For adopting the high-order modulation technology, such type of terminal has to report its own capability to the access network device first, so that the access network device can carry modulation and coding scheme (MCS) index indication information corresponding to the high-order modulation technology in downlink control information (DCI). Then, the terminal can determine an MCS and a transport block size (TBS) according to the MCS index indication information and process the data to be transmitted based on the determined MCS and TBS.

In the related arts, the earliest moment for the terminal to report its own capability to the access network device is through MSG3. However, for the terminal that adopts the EDT, MSG3 has to be used for transmitting its data instead of defining a strategy on its modulation scheme.

The present disclosure relates to the field of communication technology, and in particular, relates to a data transmission method, apparatus, and computer-readable storage medium.

Embodiments of the present disclosure provide a data transmission method, apparatus, and computer-readable storage medium, so as to enable an access network device and a terminal to use an identical modulation technology during a data transmission process to ensure a proper data transmission. The technical solutions are as follows.

Figure 2:
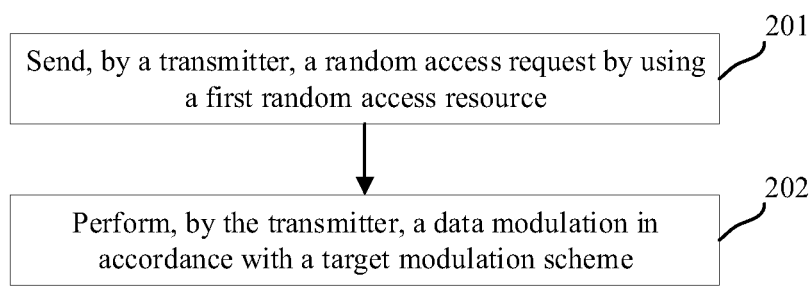
FIG. 2 illustrates a flow chart of a data transmission method according to an example.

FIG. 2 illustrates a flow chart of a data transmission method according to an example. Referring to FIG. 2, the method includes the following steps.

At step 201, a transmitter sends a random access request by using a first random access resource. The transmitter supports a first modulation scheme and a second modulation scheme. The second modulation scheme includes a high-order modulation scheme whose modulation order is higher than the modulation order of the first modulation scheme.

At step 202, the transmitter performs a data modulation in accordance with a target modulation scheme. The modulation is performed under a direction of a received random access response. The target modulation scheme is one of the first modulation scheme and the second modulation scheme.

In some examples of the present disclosure, the first random access resource is configured to the transmitter supporting the second modulation scheme. In some other examples of the present disclosure, the first random access resource is a dedicated resource configured to the transmitter supporting the second modulation scheme.

Alternatively or additionally, the step that the transmitter sends the random access request by using the first random access resource (step 201) includes that:

the transmitter sends the random access request by using the first random access resource in response to determining by the transmitter that a channel quality meets a channel quality requirement.

Alternatively or additionally, the step that the transmitter sends the random access request by using the first random access resource in response to determining by the transmitter that the channel quality meets the channel quality requirement includes that:

the transmitter sends the random access request by using the first random access resource in response to determining that an RSRP of the transmitter is higher than a threshold, or the transmitter sends the random access request by using the first random access resource in response to determining that a PRACH coverage enhancement level of the transmitter belongs to one or more target levels.

Alternatively or additionally, the first random access resource includes at least one of: a time resource, a frequency resource, or a code domain resource.

Alternatively or additionally, the method further includes that the transmitter transmits modulated data to a receiver.

In one or more examples, the transmitter transmits the modulated data to the receiver through MSG3.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

In a possible implementation, the random access response includes first indication information and second indication information. The first indication information indicates a target mapping relationship that is the first mapping relationship or the second mapping relationship, and the second indication information indicates the MCS index determined according to the target mapping relationship.

In a possible implementation, the target modulation scheme is the second modulation scheme, and the random access response includes the second indication information that indicates the MCS index determined according to the second mapping relationship.

Alternatively or additionally, the step that the transmitter performs the data modulation in accordance with the target modulation scheme (step 202) includes that: the transmitter determines the target mapping relationship corresponding to the target modulation scheme; the transmitter determines the target modulation scheme based on the target mapping relationship and the MCS index; and the transmitter performs the data modulation in accordance with the target modulation scheme.

Alternatively or additionally, the method further includes the step that: the transmitter receives configuration information sent by the receiver. The configuration information indicates the first random access resource.

In one or more examples, the step that the transmitter receives the configuration information sent by the receiver includes that: the transmitter receives a broadcast message carrying the configuration information and sent by the receiver.

In one or more examples, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

It should be noted that the aforementioned steps 201-202 and the above alternative or additional steps may be combined arbitrarily.

The examples of the present disclosure provide a method of sending the random access request, which includes that: the transmitter obtains channel quality information, and the transmitter sends the random access request in response to determining that the channel quality meets the channel quality requirement.

Alternatively or additionally, the step that the transmitter sends the random access request in response to determining that the channel quality meets the channel quality requirement includes that: the transmitter sends the random access request in response to determining that the RSRP of the transmitter is higher than the threshold, or the transmitter sends the random access request in response to determining that the PRACH coverage enhancement level of the transmitter belongs to the one or more target levels.

Other contents of the method of sending the random access request may refer to the example illustrated in FIG. 2, and their detailed description is omitted here.

The examples of the present disclosure provide a method of sending the random access request, which includes that: the transmitter obtains device capability information that indicates the modulation scheme(s) supported by the transmitter; and, the transmitter sends the random access request by using the first random access resource in response to determining that the device capability information indicates the modulation scheme(s) supported by the transmitter include the first modulation scheme and the second modulation scheme or include the second modulation scheme.

Other contents of the method of sending the random access request may refer to the example illustrated in FIG. 2, and their detailed description is omitted here.

The examples of the present disclosure provide a method of receiving the random access response, which includes: receiving the random access response that includes the first indication information and the second indication information. The first indication information indicates the target mapping relationship that is the first mapping relationship or the second mapping relationship. The second indication information indicates the MCS index determined according to the target mapping relationship.

In a possible implementation, the target modulation scheme is the second modulation scheme, and the random access response includes the second indication information that indicates the MCS index determined according to the second mapping relationship.

Figure 3:
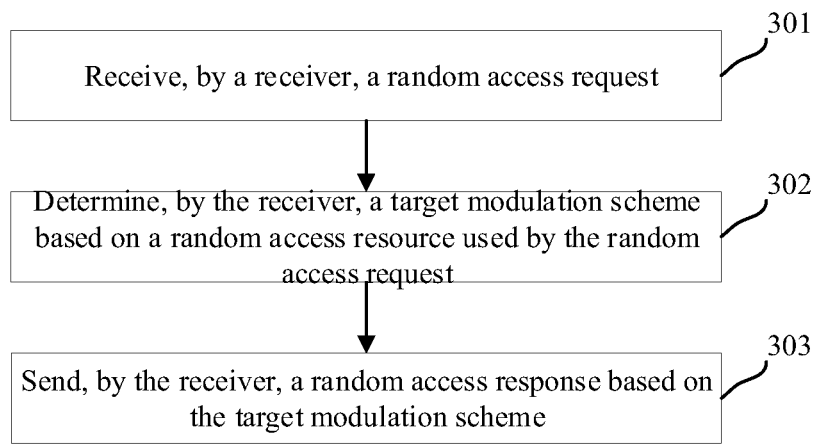
FIG. 3 illustrates a flow chart of a data transmission method according to an example.

FIG. 3 illustrates a flow chart of a data transmission method according to an example. Referring to FIG. 3, the method includes the following steps.

At step 301, a receiver receives a random access request.

At step 302, the receiver determines a target modulation scheme based on a random access resource used by the random access request. The target modulation scheme is one of a first modulation scheme and a second modulation scheme. The second modulation scheme includes a higher-order modulation scheme whose modulation order is higher than the modulation order of the first modulation scheme.

At step 303, the receiver sends a random access response based on the target modulation scheme.

Alternatively or additionally, the step that the receiver determines the target modulation scheme based on the random access resource used by the random access request includes that: the receiver determines the first modulation scheme or the second modulation scheme as the target modulation scheme in response to determining that the random access resource used by the random access request is a first random access resource; or the receiver determines the first modulation scheme as the target modulation scheme in response to determining that the random access resource used by the random access request is a second random access resource.

The first random access resource is configured to a transmitter supporting the second modulation scheme, and the second random access resource is configured to the transmitter but other than the first random access resource.

Alternatively or additionally, the method further includes that the receiver receives modulated data.

In one or more examples, the step that the receiver receives the modulated data includes that: the receiver receives the modulated data sent through MSG3.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

In a possible implementation, the random access resource used by the random access request is the first random access resource, and the random access response includes first indication information and second indication information. The first indication information indicates a target mapping relationship that is the first mapping relationship or the second mapping relationship, and the second indication information indicates the MCS index determined according to the target mapping relationship.

In a possible implementation, the random access resource used by the random access request is the first random access resource, the target modulation scheme is the second modulation scheme, and the random access response includes second indication information that indicates the MCS index determined according to the second mapping relationship.

Alternatively or additionally, the step that the receiver sends the random access response includes that: the receiver sends the random access response in accordance with the first modulation scheme; or the receiver sends the random access response in accordance with the second modulation scheme.

Alternatively or additionally, the method further includes that: the receiver sends configuration information that indicates the first random access resource.

In one or more examples, the step that the receiver sends the configuration information includes that: the receiver sends a broadcast message carrying the configuration information.

In one or more examples, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

It should be noted that the aforementioned steps 301-303 and the above alternative or additional steps may be combined arbitrarily.

The examples of the present disclosure provide a method of receiving the random access request, which includes receiving the random access request. The random access request is sent by the transmitter in response to determining that a channel quality meets a channel quality requirement.

Alternatively or additionally, the step that the random access request is sent by the transmitter in response to determining that the channel quality meets the channel quality requirement includes that: the random access request is sent in response to determining that an RSRP of the transmitter is higher than a threshold; or, the random access request is sent in response to determining that a PRACH coverage enhancement level of the transmitter belongs to one or more target levels.

Figure 4:
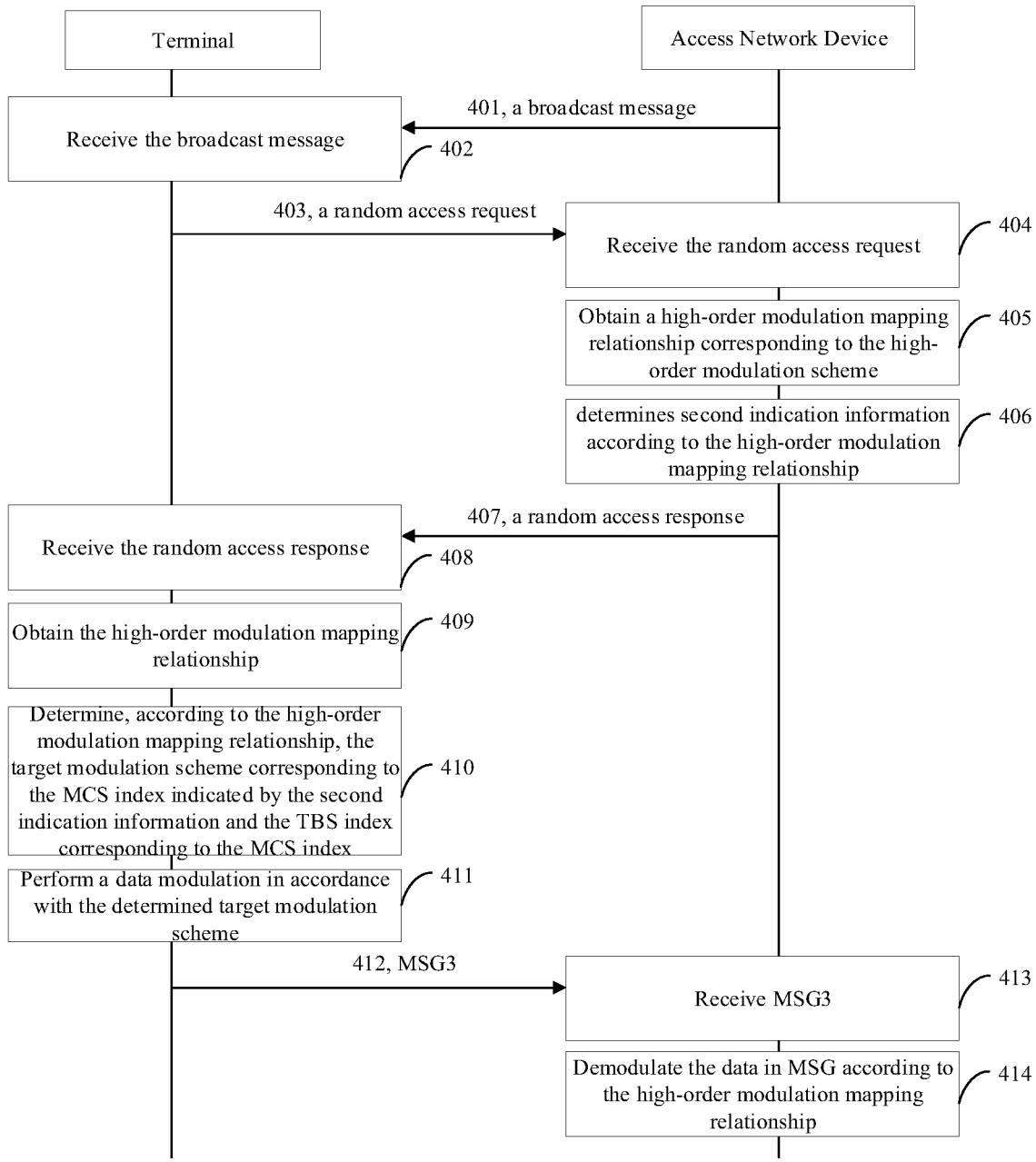
FIG. 4 illustrates a flow chart of a data transmission method according to an example.

Other contents of the method of receiving the random access request may refer to the example illustrated in FIG. 4, and their detailed description is omitted here.

The examples of the present disclosure provides a method of receiving the random access request, which includes receiving the random access request sent by the transmitter that supports at least the second modulation scheme.

Other contents of the method of sending the random access request may refer to the example illustrated in FIG. 4, and their detailed description is described in relation to FIG. 4.

The examples of the present disclosure provide a method of sending the random access response, which includes that: the random access response that includes the first indication information and the second indication information is sent. The first indication information indicates the target mapping relationship that is the first mapping relationship or the second mapping relationship. The second indication information indicates the MCS index determined according to the target mapping relationship.

In a possible implementation, the target modulation scheme is the second modulation scheme, and the random access response includes the second indication information that indicates the MCS index determined according to the second mapping relationship.

In a possible implementation, the random access response is generated based on the received random access request sent by the transmitter. In some possible implementations, the random access request may refer to the implementations illustrated in FIG. 2 and FIG. 3.

The examples of the present disclosure provide a random access method, which is applied to the receiver. In some examples, the receiver may be illustrated as the access network device.

In the examples of the present disclosure, the receiver supports both a high-order modulation scheme and a low-order modulation scheme, and thus the receiver simultaneously stores a high-order modulation mapping relationship and a low-order modulation mapping relationship. The high-order modulation mapping relationship corresponds to the high-order modulation scheme (for example, the high-order modulation mapping relationship includes the high-order modulation scheme), and the low-order modulation mapping relationship corresponds to the low-order modulation scheme (for example, the low-order modulation mapping relationship includes the low-order modulation scheme). Both the high-order modulation mapping relationship and the low-order modulation mapping relationship are among MCS indexes, modulation schemes and TBS indexes.

The examples of the present disclosure provide a method of determining a relationship among MCS indexes, modulation schemes and TBS indexes. In one or more examples, the mapping relationship among MCS indexes, modulation schemes and TBS indexes may be presented in one table. For example, Table 1 shows the high-order modulation mapping relationship corresponding to the high-order modulation scheme. In Table 1, the first, second and third columns show the MCS indexes, the modulation schemes and the TBS indexes, respectively. It should be noted that the mapping relationship among MCS indexes, modulation schemes and TBS indexes may also be presented in multiple tables. For example, one table is used for the correspondence relationship between the MCS indexes and the modulation schemes, and the other table is used for the mapping relationship between the MCS indexes and the TBS indexes.

TABLE 1

High-order modulation mapping relationship

| $I_{MCS}$ | Modulation Scheme | $I_{TBS}$ |
|---|---|---|
| 0 | 16QAM | 0 |
| 1 | 16QAM | 1 |
| 2 | 16QAM | 2 |
| 3 | 16QAM | 3 |
| 4 | 64QAM | 4 |
| 5 | 64QAM | 5 |
| ... | ... | ... |

It should be understood that each element in Table 1 exists independently. These elements are listed as an example in one table, but it does not mean that all elements in the table have to exist at the same time as shown by the table. For each element, its value does not depend on the value of any other element in Table 1. Therefore, those skilled in the art can understand that the value of each element in Table 1 is an independent example.

The TBS indexes in the high-order modulation mapping relationship are different from the TBS indexes in the low-order modulation mapping relationship. For example, the number of the TBS indexes in the high-order modulation mapping relationship is greater than the number of the TBS indexes in the low-order modulation mapping relationship. Correspondingly, the TBS table corresponding to the high-order modulation mapping relationship is expanded accordingly more than the TBS table corresponding to the low-order modulation mapping relationship. For example, the TBS indexes are 0-13 in Table 2 and 0-20 in Table 3.

The MCS indexes and the TBS indexes are in one-to-one correspondence, for example, being identical. Thus, when the TBS index increases, the MCS index increases correspondingly and indication information corresponding to the MCS index also increases correspondingly. That is, the TBS table corresponding to the high-order modulation technology is different from that corresponding to the low-order modulation technology, the mapping relationship between the MCS indexes and the TBS indexes corresponding to the high-order modulation technology is different from that corresponding to the low-order modulation technology, and the mapping relationship between the indication information and the MCS indexes corresponding to the high-order modulation technology is different from that corresponding to the low-order modulation technology.

An example of the present disclosure provides a TBS table corresponding to one low-order modulation mapping relationship, as shown in Table 2 below.

TABLE 2

TBS table corresponding to a low-order modulation mapping relationship

| | $I_{SF}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

It should be understood that each element in Table 2 exists independently. These elements are listed as an example in one table, but it does not mean that all elements in the table have to exist at the same time as shown by the table. For each element, its value does not depend on the value of any other element in Table 2. Therefore, those skilled in the art can understand that the value of each element in Table 2 is an independent example.

An example of the present disclosure provides a TBS table corresponding to one high-order modulation mapping relationship, as shown in Table 3 below.

TABLE 3

TBS table corresponding to a high-order modulation mapping relationship

| | $I_{SF}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |

TABLE 3-continued

TBS table corresponding to a high-
order modulation mapping relationship

| | $I_{SF}$ | | | | | | | |
|---|---|---|---|---|---|---|---|---|
| $I_{TBS}$ | 0 | 1 | 2 | 3 | 4 | 5 | 6 | 7 |
| 7 | 104 | 224 | 328 | 472 | 584 | 712 | 968 | 1352 |
| 8 | 120 | 256 | 392 | 536 | 680 | 808 | 1096 | 1384 |
| 9 | 136 | 296 | 456 | 616 | 776 | 936 | 1352 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1000 | 1352 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | 1352 | 1608 | 1928 | 2600 | 3240 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | 1352 | 1736 | 2152 | 2600 | 3496 | 4264 |
| 20 | 440 | 904 | 1384 | 1864 | 2344 | 2792 | 3752 | 4584 |

It should be understood that each element in Table 3 exists independently. These elements are listed as an example in one table, but it does not mean that all elements in the table have to exist at the same time as shown by the table. For each element, its value does not depend on the value of any other element in Table 3. Therefore, those skilled in the art can understand that the value of each element in Table 3 is an independent example.

An example of the present disclosure provides a TBS table in LTE, as shown in Table 4 below.

TABLE 4

TBS table in LTE

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

It should be understood that each element in Table 4 exists independently. These elements are listed as an example in one table, but it does not mean that all elements in the table have to exist at the same time as shown by the table. For each element, its value does not depend on the value of any other element in Table 4. Therefore, those skilled in the art can understand that the value of each element in Table 4 is an independent example.

It should be noted that Table 2 and Table 3 take the TBS tables for the NB-IoT device as the examples for description and Table 4 shows the TBS table in a Long Term Evolution (LTE) system. In other words, Table 2 includes TBS 0-13 and $N_{PRB}$ 1, 2, 3, 4, 5, 6, 8 and 10 cut from Table 4, i.e., the part in bold font in Table 4.

For ease of description, the following will take examples for description, in which the transmitter is the terminal and the receiver is the access network device.

FIG. 4 illustrates a flow chart of a data transmission method according to an example. This method is performed by both the access network device and the terminal. The terminal may be the one in the communication system illustrated in FIG. 1, such as the MTC device and the NB-IoT device. The terminal supports both a first modulation scheme and a second modulation scheme, and the second modulation scheme includes a higher-order modulation scheme whose modulation order is higher than the modulation order of the first modulation scheme. For ease of description, in the example illustrated in FIG. 4, the first modulation scheme is called a low-order modulation scheme, and the second modulation scheme is called the high-order modulation scheme. A first mapping relationship corresponding to the first modulation scheme is called a low-order modulation mapping relationship, and a second mapping relationship corresponding to the second modulation scheme is called a high-order modulation mapping relationship.

In one or more examples, the first modulation scheme may include at least one of the following modulation schemes: a QPSK modulation scheme or a BPSK modulation scheme. The second modulation scheme may include at least one of the following modulation schemes: a 16-QAM scheme, or a 64-QAM scheme. That is, the first modulation scheme may include one modulation scheme or include at least two modulation schemes, and the second modulation scheme may include one modulation scheme or include at least two modulation schemes.

Referring to FIG. 4, the method includes the following steps.

At step 401, the access network device sends a broadcast message.

The broadcast message carries configuration information used to indicate a first random access resource. The first random access resource is configured to the terminal supporting the high-order modulation scheme, that is, the first random access resource is the dedicated resource for the terminal supporting the high-order modulation scheme.

Alternatively or additionally, the broadcast message also carries configuration information used to indicate all random access resources, or carries configuration information used to indicate a second random access resource. The second random access resource is configured to the terminal supporting the low-order modulation scheme. The second random access resource is configured to the terminal but other than the first random access resource.

Alternatively or additionally, the first random access resource includes at least one of: a time resource, a frequency resource, or a code domain resource.

At step 402, the terminal receives the broadcast message.

The terminal may determine the first random access resource and the second random access resource from the broadcast message.

In a possible implementation, when the broadcast message carries the configuration information used to indicate the first random access resource and the configuration information used to indicate all the random access resources, the terminal may learn the first random access resource according to the configuration information used to indicate the first random access resource, and learn all the random access resources according to the configuration information used to indicate all the random access resources. All the random access resources are the second random access resource except the first random access resource.

In another possible implementation, when the broadcast message carries the configuration information used to indicate the first random access resource and the configuration information used to indicate the second random access resource, the terminal may determine the first random access resource according to the configuration information used to indicate the first random access resource, and determine the second random access resource according to the configuration information used to indicate the second random access resources.

At step 403, the terminal sends a random access request by using the first random access resource.

In a possible implementation, after learning the first random access resource, the terminal supporting the high-order modulation scheme sends the random access request by directly using the first random access resource when it is to initiate a random access procedure.

Correspondingly, a terminal that only supports the low-order modulation scheme (i.e., that does not support the high-order modulation scheme) sends the random access request by using the second random access resource when it is to initiate the random access procedure.

That is, in this example, the terminal may determine whether to send the random access request by using the first random access resource or the second random access resource based on its own capability (i.e., whether it supports the high-order modulation scheme).

At step 404, the access network device receives the random access request.

At step 405, the access network device obtains a high-order modulation mapping relationship corresponding to the high-order modulation scheme.

Since the random access request is sent by using the first random access resource dedicated to the terminal supporting the high-order modulation scheme, the access network device may determine the capability of the terminal based on the random access request, i.e., determine that the terminal has the capability of supporting the high-order modulation scheme. In this example, the access network device directly determines the high-order modulation scheme as a target modulation scheme, and obtains the high-order modulation mapping relationship.

In the examples of the present disclosure, the access network device supports both the high-order modulation scheme and the low-order modulation scheme, and thus the access network device stores both the high-order modulation mapping relationship and the low-order modulation mapping relationship. The high-order modulation mapping relationship corresponds to the high-order modulation scheme, and the low-order modulation mapping relationship corresponds to the low-order modulation scheme. Both the high-order modulation mapping relationship and the low-order modulation mapping relationship are among MCS indexes, modulation schemes and TBS indexes.

The examples of the present disclosure provide a method of determining the relationship among MCS indexes, modulation schemes and TBS indexes. In one or more examples, the mapping relationship among MCS indexes, modulation schemes and TBS indexes may be presented in one table. For example, Table 5 shows the high-order modulation mapping relationship corresponding to the high-order modulation scheme. In Table 5, the first, second and third columns show the MCS indexes, the modulation schemes and the TBS indexes, respectively. It should be noted that the mapping relationship among MCS indexes, modulation schemes and TBS indexes may also be presented in multiple tables. For example, one table is used for the correspondence relationship between the MCS indexes and the modulation schemes, and the other table is used for the mapping relationship between the MCS indexes and the TBS indexes.

TABLE 5

High-order modulation mapping relationship

| $I_{MCS}$ | Modulation Scheme | $I_{TBS}$ |
|---|---|---|
| 0 | 16QAM | 0 |
| 1 | 16QAM | 1 |
| 2 | 16QAM | 2 |
| 3 | 16QAM | 3 |
| 4 | 64QAM | 4 |
| 5 | 64QAM | 5 |
| ... | ... | ... |

It should be understood that each element in Table 5 exists independently. These elements are listed as an example in one table, but it does not mean that all elements in the table have to exist at the same time as shown by the table. For each element, its value does not depend on the value of any other element in Table 5. Therefore, those skilled in the art can understand that the value of each element in Table 5 is an independent example.

The TBS indexes in the high-order modulation mapping relationship are different from the TBS indexes in the low-order modulation mapping relationship. For example, the number of the TBS indexes in the high-order modulation mapping relationship is greater than the number of the TBS indexes in the low-order modulation mapping relationship. Correspondingly, the TBS table corresponding to the high-order modulation mapping relationship is expanded accordingly more than the TBS table corresponding to the low-order modulation mapping relationship. For example, the TBS indexes are 0-13 in Table 6 and 0-20 in Table 7.

The MCS indexes and the TBS indexes are in one-to-one correspondence, for example, being identical. Thus, when the TBS index increases, the MCS index increases correspondingly and indication information corresponding to the MCS index also increases correspondingly. That is, the TBS table corresponding to the high-order modulation technology is different from that corresponding to the low-order modulation technology, the mapping relationship between the MCS indexes and the TBS indexes corresponding to the high-order modulation technology is different from that corresponding to the low-order modulation technology, and the mapping relationship between the indication information and the MCS indexes corresponding to the high-order modulation technology is different from that corresponding to the low-order modulation technology.

Table 6 and Table 7 are TBS tables separately illustrated by the examples of the present disclosure.

TABLE 6

TBS table corresponding to a low-order modulation mapping relationship

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

It should be understood that each element in Table 6 exists independently. These elements are listed as an example in one table, but it does not mean that all elements in the table have to exist at the same time as shown by the table. For each element, its value does not depend on the value of any other element in Table 6. Therefore, those skilled in the art can understand that the value of each element in Table 6 is an independent example.

TABLE 7

TBS table corresponding to a high-order modulation mapping relationship

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |
| 7 | 104 | 224 | 328 | 472 | 584 | 712 | 968 | 1352 |
| 8 | 120 | 256 | 392 | 536 | 680 | 808 | 1096 | 1384 |
| 9 | 136 | 296 | 456 | 616 | 776 | 936 | 1352 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1000 | 1352 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | 1352 | 1608 | 1928 | 2600 | 3240 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | 1352 | 1736 | 2152 | 2600 | 3496 | 4264 |
| 20 | 440 | 904 | 1384 | 1864 | 2344 | 2792 | 3752 | 4584 |

It should be understood that each element in Table 7 exists independently. These elements are listed as an example in one table, but it does not mean that all elements in the table have to exist at the same time as shown by the table. For each element, its value does not depend on the value of any other element in Table 7. Therefore, those skilled in the art can understand that the value of each element in Table 7 is an independent example.

TABLE 8

TBS table in LTE

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |

TABLE 8-continued

TBS table in LTE

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

It should be understood that each element in Table 8 exists independently. These elements are listed as an example in one table, but it does not mean that all elements in the table have to exist at the same time as shown by the table. For each element, its value does not depend on the value of any other element in Table 8. Therefore, those skilled in the art can understand that the value of each element in Table 8 is an independent example.

It should be noted that Table 6 and Table 7 take the TBS tables for the NB-IoT device as the examples for description and Table 8 shows the TBS table in an LTE system. Basically, Table 6 includes TBS 0-13 and $N_{PRB}$ 1, 2, 3, 4, 5, 6, 8 and 10 cut from Table 8, i.e., the part in bold font in Table 8.

At step 406, the access network device determines second indication information according to the high-order modulation mapping relationship.

In one or more examples, the access network device may first determine the TBS configured for the terminal, then determine the TBS index based on the TBS and the amount of resources allocated to the terminal, then determine the corresponding MCS index based on the TBS index and the target modulation scheme, and finally obtain the second indication information corresponding to the MCS index.

At step 407, the access network device sends a random access response.

The random access response includes the second indication information.

In a possible implementation, the access network device sends the random access response in accordance with the low-order modulation technique. At the same time, the access network device indicates the MCS index according to the low-order modulation mapping relationship through the downlink control channel corresponding to the random access response. For example, in all cases, whether any terminal with the first random access resource is detected or not, the access network device always modulates the random access response in accordance with the low-order modulation technology. At the same time, the access network device indicates the MCS index corresponding to the random access response according to the first mapping relationship through the downlink control channel corresponding to the random access response.

In another possible implementation, the access network device sends the random access response in accordance with the high-order modulation technique. For example, for the terminal using the first random access resource, the modulation scheme adopted by the random access response is determined according to the high-order modulation mapping relationship. At the same time, the access network device indicates the corresponding MCS index according to the second mapping relationship through the downlink control channel of the random access response.

At step 408, the terminal receives the random access response.

The terminal determines the target mapping relationship adopted by the random access response according to a preset rule, for example, adopting the low-order modulation mapping relationship by default or the high-order modulation mapping relationship by default. Then, the terminal receives the downlink control channel corresponding to the random access response, and determines the TBS and the modulation scheme of the random access response according to the target mapping relationship and the MCS index in the downlink control channel.

At step 409, the terminal obtains the high-order modulation mapping relationship for the to-be-transmitted data.

It may also be considered as obtaining the high-order modulation mapping relationship corresponding to MSG3.

Both the high-order modulation mapping relationship and the low-order modulation mapping relationship have been stored in the terminal. The high-order modulation mapping relationship may be obtained by reading the stored high-order modulation mapping relationship. The high-order modulation mapping relationship and the low-order modulation mapping relationship stored in the terminal are identical with the high-order modulation mapping relationship and the low-order modulation mapping relationship stored in the access network device.

The terminal has sent the random access request to the access network device by using the first random access resource in step 403 to notify the access network device that the terminal has the capability of supporting the high-order modulation scheme, so that the access network device determines the second indication information according to the high-order modulation mapping relationship corresponding to the high-order modulation scheme. Therefore, after receiving the random access response carrying the second indication information, the terminal is to obtain the same high-order modulation mapping relationship to determine the corresponding target modulation scheme corresponding to the MCS index and the TBS index corresponding to the MCS index.

At step 410, the terminal determines, according to the high-order modulation mapping relationship, the target modulation scheme corresponding to the MCS index indicated by the second indication information and the TBS index corresponding to the MCS index.

For example, assuming that the MCS index is 2 when the high-order modulation mapping relationship shown in Table 5 as above is obtained, the target modulation scheme corresponding to the MCS index is 16 QAM, and the TBS index corresponding to the MCS index is 2.

At step 411, the terminal performs a data modulation in accordance with the determined target modulation scheme.

Alternatively or additionally, before step 411, it may include the following steps: the terminal determines the TBS according to the TBS index; and the terminal performs channel coding based on the MCS indicated by and the MCS index and the TBS.

At step 412, the terminal sends MSG3 to the access network device.

The MSG3 includes modulated data. After the transmission is successful, the terminal goes idle or inactive.

At step 413, the access network device receives MSG3.

Through these steps 412 and 413, it can achieve that the terminal transmits the modulated data to the access network device.

At step 414, the access network device demodulates the data in MSG3 according to the high-order modulation mapping relationship.

In this step 414, the access network device determines the target modulation scheme corresponding to the MCS index according to the high-order modulation mapping relationship, and demodulates the data in accordance with the target modulation scheme.

Alternatively or additionally, before step 414, it may also include the following steps: the terminal determines the TBS according to the TBS index; and the terminal performs channel decoding based on the MCS indicated by the MCS index and the TBS.

By setting the first random access resource dedicated to the terminal supporting the high-order modulation scheme, the access network device can learn the capability of the terminal based on the random access resource that is used by the terminal for sending the random access request, and then select, based on the capability of the terminal, the corresponding modulation scheme to perform the data transmission, so as to avoid data transmission failure due to inconsistent modulation schemes adopted between the access network device and the terminal.

In addition, both the access network device and the terminal adopt the high-order modulation technology in the case where the terminal's capability supports the high-order modulation technology, which can increase the amount of the transmitted data, thereby increasing the efficiency of the data transmission.

Figure 5:
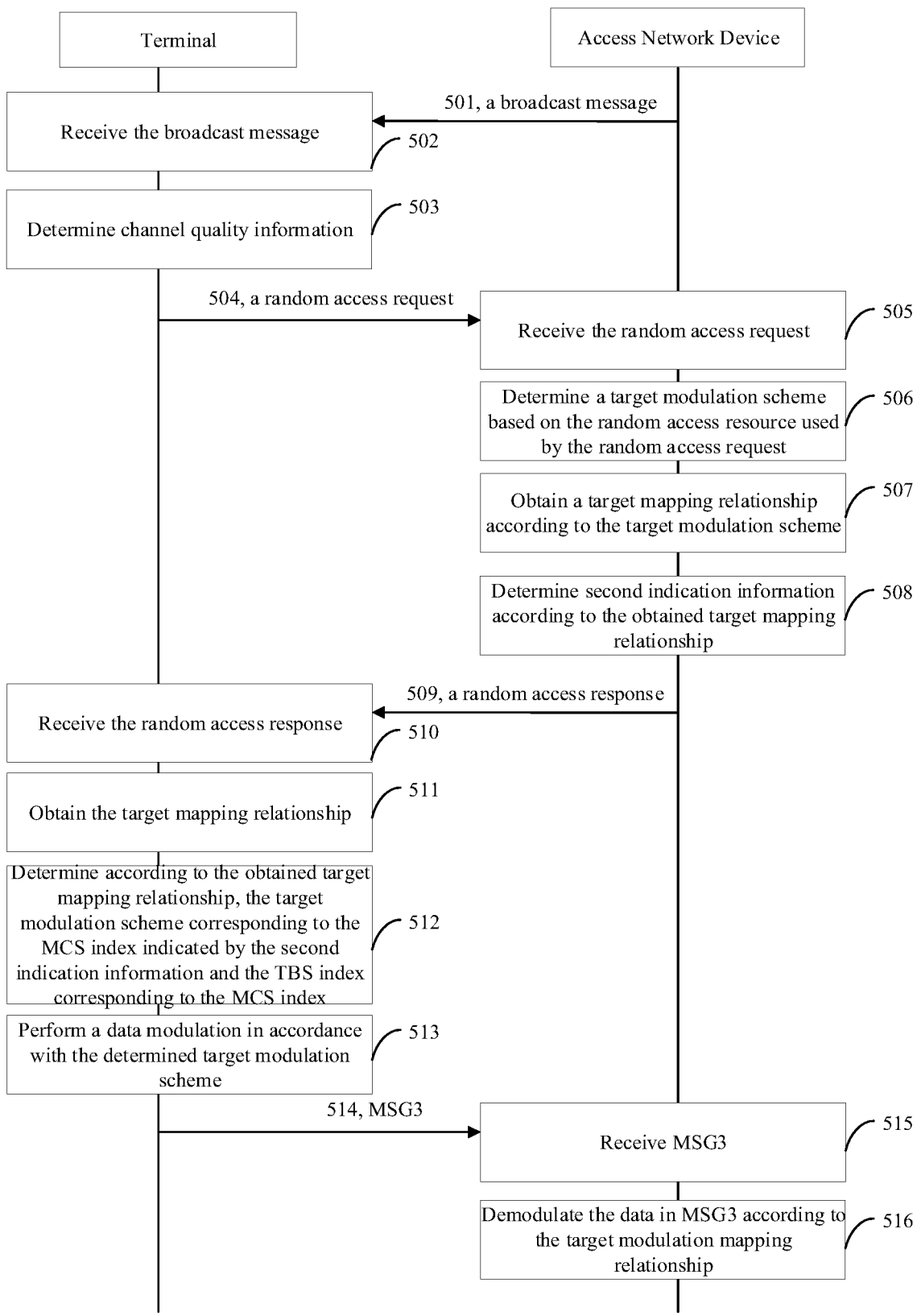
FIG. 5 illustrates a flow chart of a data transmission method according to an example.

FIG. 5 illustrates a flow chart of a data transmission method according to an example. This method is performed by both the access network device and the terminal. The terminal may be the one in the communication system illustrated in FIG. 1, such as the MTC device and the NB-IoT device. The terminal supports both a first modulation scheme and a second modulation scheme. For ease of description, in the example illustrated in FIG. 5, the first modulation scheme is called a low-order modulation scheme, and the second modulation scheme is called a high-order modulation scheme. The related contents of the first modulation scheme and the second modulation scheme may refer to the example described in FIG. 4, and their detailed descriptions are omitted here.

The difference between the example illustrated in FIG. 5 and the example illustrated in FIG. 4 is that in the example illustrated in FIG. 5, the terminal sends the random access request by using the first random access resource under good channel quality. Referring to FIG. 5, the method includes the following steps.

At step 501, the access network device sends a broadcast message.

The broadcast message carries configuration information used to indicate the first random access resource.

At step 502, the terminal receives the broadcast message.

The terminal may determine the first random access resource and the second random access resource from the broadcast message.

The related contents of the first random access resource, the second random access resource and the broadcast message in these steps 501 and 502 may refer to the foregoing steps 401 and 402, and their detailed descriptions are omitted here.

At step 503, the terminal determines channel quality information.

Alternatively or additionally, the channel quality information includes at least one of: a RSRP or a PRACH coverage enhancement level.

In one or more examples of the present disclosure, the PRACH coverage enhancement level of the terminal may be determined according to a mapping relationship between RSRPs and coverage enhancement levels.

For example, the mapping relationship between RSRPs and PRACH coverage enhancement levels may be shown as Table 9.

TABLE 9

Mapping relationship between RSRPs
and coverage enhancement levels

| RSRP | PRACH Coverage Enhancement Level |
|---|---|
| A1-A2 | Level 0 |
| A2-A3 | Level 1 |
| . . . | . . . |

In Table 9, A1 is the largest, and A2 and A3 decrease in order. It can be seen from Table 9 that the larger the RSRP, the lower the coverage enhancement level. Coverage enhancement level 0 corresponds to the largest RSRP.

At step 504, the terminal selects a corresponding random access resource based on the channel quality information to send a random access request.

In this example, after learning the first random access resource, the terminal supporting the high-order modulation scheme determines to use the first random access resource or the second random access resource to send the random access request based on the channel quality information when it is to initiate a random access procedure.

In one possible implementation, this step 504 may include that:
  the terminal sends the random access request by using the first random access resource in response to determining that a channel quality meets a channel quality requirement.

Alternatively or additionally, the step that the terminal sends the random access request by using the first random access resource in response to determining that the channel quality meets the channel quality requirement includes: sending the random access request by using the first random access resource in response to determining that the RSRP of the transmitter is higher than a threshold; or sending the random access request by using the first random access resource in response to determining that the PRACH coverage enhancement level of the transmitter belongs to one or more target levels.

In one or more examples, both the threshold value and the target levels may be set according to actual requirements. For example, the target level(s) may be coverage enhancement level 0, or may be coverage enhancement levels 0 and 1.

Alternatively, this step 504 may include that: the terminal sends the random access request to the access network device by using the second random access resource in response to determining that the channel quality does not meet the channel quality requirement.

That is, in such implementation, the terminal supporting the higher-order modulation scheme sends the random access request by using the first random access resource when the channel quality is good, but sends the random access request by using the second random access resource when the channel quality is poor. Since the high-order modulation scheme has a high data transmission rate and expects a high channel quality, it can improve the data transmission performance to send the random access request by using the first random access resource under the good channel quality.

At step 505, the access network device receives the random access request.

At step 506, the access network device determines a target modulation scheme based on the random access resource used by the random access request.

This step 506 may include that: the access network device determines the low-order modulation scheme or the high-order modulation scheme as the target modulation scheme in response to determining that the random access resource used by the random access request is the first random access resource; or the access network device determines the low-order modulation scheme as the target modulation scheme in response to determining that the random access resource used by the random access request is the second random access resource.

When the low-order modulation scheme corresponds to at least two modulation schemes and the target modulation scheme is the low-order modulation scheme, it means that the target modulation scheme is one modulation scheme selected from the at least two modulation schemes corresponding to the low-order modulation scheme.

When the high-order modulation scheme corresponds to at least two modulation schemes and the target modulation scheme is the high-order modulation scheme, it means that the target modulation scheme is one modulation scheme selected from the at least two modulation schemes corresponding to the high-order modulation scheme.

The access network device may determine the capability of the terminal (i.e., determine whether the terminal has the capability of supporting the high-order modulation scheme) and the channel quality based on the random access resource corresponding to the random access request, thereby determining the corresponding target modulation scheme of the terminal.

At step 507, the access network device obtains a target mapping relationship according to the target modulation scheme.

Both the high-order modulation mapping relationship and the low-order modulation mapping relationship have been stored in the access network device. The related contents of the high-order modulation mapping relationship and the low-order modulation mapping relationship may refer to step 405, and their detailed description is omitted here.

The target mapping relationship is one of the high-order modulation mapping relationship and the low-order modulation mapping relationship.

In this step 507, the obtained target mapping relationship is the high-order modulation mapping relationship corresponding to the high-order modulation scheme when the target modulation scheme is the high-order modulation scheme; or, the obtained target mapping relationship is the low-order modulation mapping relationship corresponding to the low-order modulation scheme when the target modulation scheme is the low-order modulation scheme.

At step 508, the access network device determines second indication information according to the obtained target mapping relationship.

The second indication information indicates an MCS index.

In one or more examples, the access network device may first determine the TBS configured for the terminal, then determine the TBS index based on the TBS and the amount of resources allocated to the terminal, then determine the corresponding MCS index based on the TBS index and the target modulation scheme, and finally obtain the second indication information corresponding to the MCS index.

At step 509, the access network device sends a random access response to the terminal.

The random access response carries the second indication information.

At step 510, the terminal receives the random access response.

Through steps 507 to 510, it can be achieved that the access network device sends the random access response to the terminal based on the target modulation scheme.

At step 511, the terminal obtains the target mapping relationship.

For the terminal that supports both the high-order modulation scheme and the low-order modulation scheme, the high-order modulation mapping relationship and the low-order modulation mapping relationship have been stored in the terminal. The high-order modulation mapping relationship and the low-order modulation mapping relationship stored in the terminal are identical with the high-order modulation mapping relationship and the low-order modulation mapping relationship stored in the access network device.

Correspondingly, this step 511 includes: obtaining the high-order modulation mapping relationship if the terminal sent the random access request to the access network device by using the first random access resource.

For the terminal that only supports the low-order modulation scheme, the low-order modulation mapping relationship has been stored in the terminal. Correspondingly, this step 511 includes: obtaining the low-order modulation mapping relationship if the terminal sent the random access request to the access network device by using the second random access resource.

After receiving the random access response carrying the second indication information, the terminal is to obtain the mapping relationship identical with the modulation mapping relationship determined from the second indication information, so as to determine the target modulation scheme and the TBS index corresponding respectively to the MCS index, thereby ensuring the consistence with the access network device.

At step 512, the terminal determines, according to the obtained target mapping relationship, the target modulation scheme corresponding to the MCS index indicated by the second indication information and the TBS index corresponding to the MCS index.

At step 513, the terminal performs a data modulation in accordance with the determined target modulation scheme.

At step 514, the terminal sends MSG3 to the access network device.

The MSG3 includes modulated data. After the transmission is successful, the terminal goes idle or inactive.

At step 515, the access network device receives MSG3.

At step 516, the access network device demodulates the data in MSG3 according to the target modulation mapping relationship.

In this step 516, the access network device determines the target modulation scheme corresponding to the MCS index according to the target modulation mapping relationship, and demodulates the data in accordance with the target modulation scheme.

By setting the first random access resource dedicated to the terminal supporting the high-order modulation scheme, the access network device can learn the capability of the terminal based on the random access resource that is used by the terminal for sending the random access request, and then select, based on the capability of the terminal, the corresponding modulation scheme to perform the data transmission, so as to avoid data transmission failure due to inconsistent modulation schemes adopted between the access network device and the terminal.

In addition, both the access network device and the terminal adopt the high-order modulation technology in the case where the terminal's capability supports the high-order modulation technology as well as the channel quality is good, which can increase the amount of the transmitted data, thereby increasing the efficiency of the data transmission.

Figure 6:
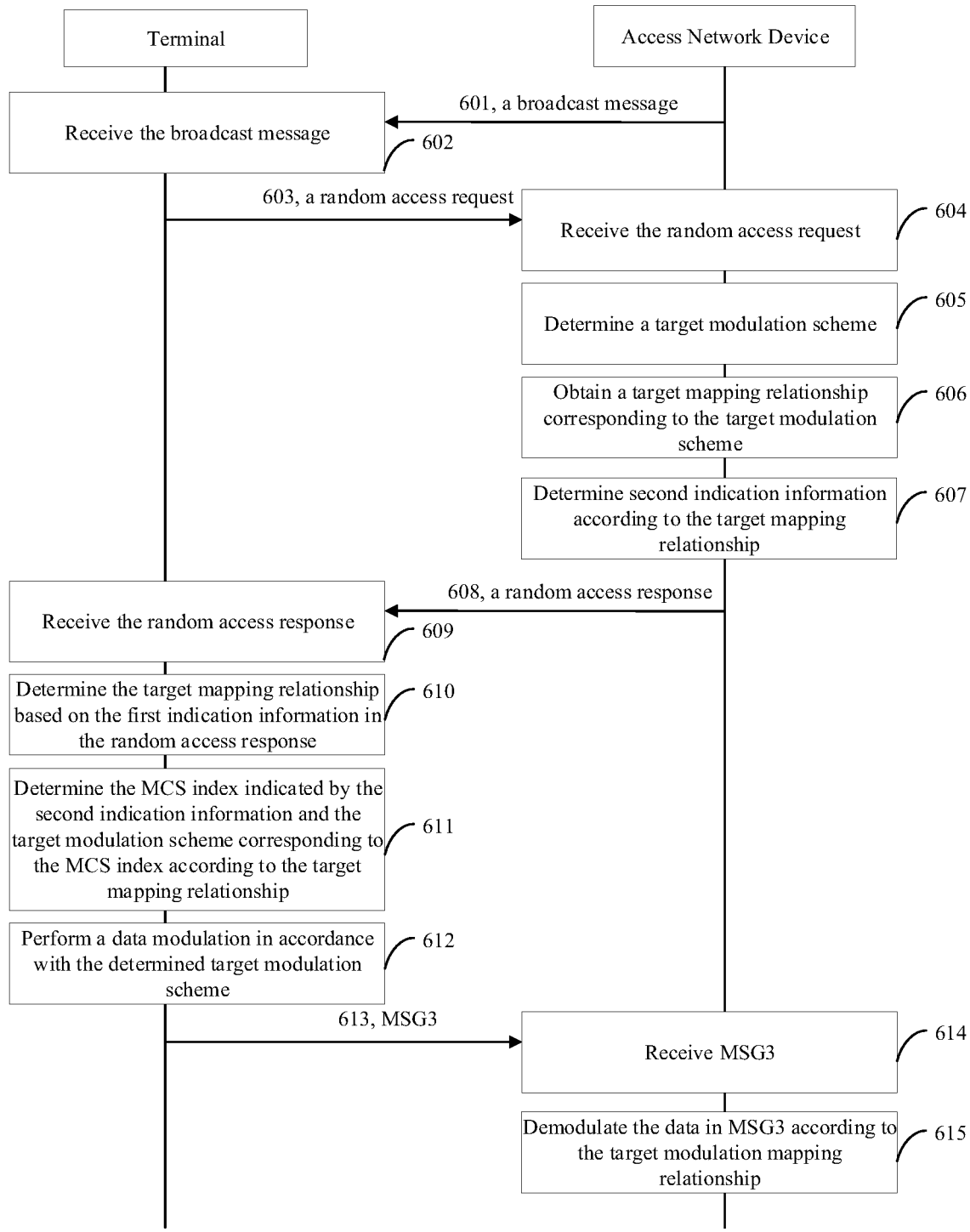
FIG. 6 illustrates a flow chart of a data transmission method according to an example.

FIG. 6 illustrates a flow chart of a data transmission method according to an example. This method is performed by both the access network device and the terminal. The terminal may be the terminal in the communication system illustrated in FIG. 1, such as the MTC device and the NB-IoT device. The terminal supports both a first modulation scheme and a second modulation scheme. For ease of description, in the example illustrated in FIG. 6, the first modulation scheme is called a low-order modulation scheme, and the second modulation scheme is called a high-order modulation scheme. The related contents of the first modulation scheme and the second modulation scheme may refer to the example described in FIG. 4, and their detailed descriptions are omitted here.

The difference between the example illustrated in FIG. 6 and the example illustrated in FIG. 4 or FIG. 5 is that in the example illustrated in FIG. 6, the access network device may select a modulation scheme for the terminal as required and instruct the terminal the selected modulation scheme through the random access response when the access network device receives the random access request sent by the terminal using the first random access resource. Referring to FIG. 6, the method includes the following steps.

At step 601, the access network device sends a broadcast message.

The broadcast message carries configuration information used to indicate the first random access resource.

At step 602, the terminal receives the broadcast message.

The terminal may determine the first random access resource and the second random access resource from the broadcast message.

The related contents of the first random access resource, the second random access resource and the broadcast message may refer to steps 401 and 402, and their detailed descriptions are omitted here.

At step 603, the terminal sends a random access request by using the first random access resource.

The implementation of this step 603 may refer to step 403, or refer to steps 503 and 504.

At step 604, the access network device receives the random access request.

At step 605, the access network device determines a target modulation scheme.

In this step 605, the access network device may determine the high-order modulation scheme or the low-order modulation scheme as the target modulation scheme based on a coverage enhancement level of the terminal and/or a scheduling strategy.

For example, the access network device may determine the high-order modulation scheme as the target modulation scheme when the coverage enhancement level of the terminal is a required level. The examples of the present disclosure do not limit the approach by which the access network device selects the target modulation scheme.

At step 606, the access network device obtains a target mapping relationship corresponding to the target modulation scheme.

Alternatively or additionally, in this step 606, the access network device obtains a high-order modulation mapping relationship when the target modulation scheme is the high-order modulation scheme, or, the access network device obtains a low-order modulation mapping relationship when the target modulation scheme is the low-order modulation scheme.

In this example, the access network device has stored both the high-order modulation mapping relationship and the low-order modulation mapping relationship. The high-order modulation mapping relationship or the low-order modulation mapping relationship is selected as required. The related contents of the high-order modulation mapping relationship and the low-order modulation mapping relationship may refer to step 405, which will not be repeated here.

At step 607, the access network device determines second indication information according to the target mapping relationship.

In this step 607, the access network device first determines an MCS index, and then determines the second indication information corresponding to the MCS index.

At step 608, the access network device sends a random access response.

In this example, the random access response includes first indication information and the second indication information. The first indication information indicates the target mapping relationship, and the second indication information is determined in step 607. That is, the random access response includes two fields, with one field carrying the first indication information and the other field carrying the second indication information.

In one or more examples, the MCS index indicated by the second indication information is determined according to the high-order modulation mapping relationship when the target modulation scheme is the high-order modulation scheme; or, the MCS index indicated by the second indication information is determined according to the low-order modulation mapping relationship when the target modulation scheme is the low-order modulation scheme.

At step 609, the terminal receives the random access response.

At step 610, the terminal determines the target mapping relationship based on the first indication information in the random access response.

At step 611, the terminal determines the MCS index indicated by the second indication information and the target modulation scheme corresponding to the MCS index according to the target mapping relationship.

At step 612, the terminal performs a data modulation in accordance with the determined target modulation scheme.

At step 613, the terminal sends MSG3 to the access network device.

The MSG3 includes modulated data. After the transmission is successful, the terminal goes idle or inactive.

At step 614, the access network device receives MSG3.

At step 615, the access network device demodulates the data in MSG3 according to the target modulation mapping relationship.

In this step 615, the access network device determines the target modulation scheme corresponding to the MCS index according to the high-order modulation mapping relationship, and demodulates the data in accordance with the target modulation scheme.

By setting the first random access resource dedicated to the terminal supporting the high-order modulation scheme, the access network device can learn the capability of the terminal based on the random access resource that is used by the terminal for sending the random access request, and then select, based on the capability of the terminal, the corresponding modulation scheme to perform the data transmission, so as to avoid data transmission failure due to inconsistent modulation schemes adopted between the access network device and the terminal.

In addition, both the access network device and the terminal adopt the high-order modulation technology in the case where the terminal's capability supports the high-order modulation technology or in the case where the terminal's capability supports the high-order modulation technology as well as the channel quality is good, which can increase the amount of the transmitted data, thereby increasing the efficiency of the data transmission.

Furthermore, in the case where the terminal's capability supports the high-order modulation technology, the access network device can select to adopt the high-order modulation technology or the low-order modulation technology as required for the data transmission, and inform the terminal of the selected modulation technology, which can be applied more flexibly.

Figure 7:
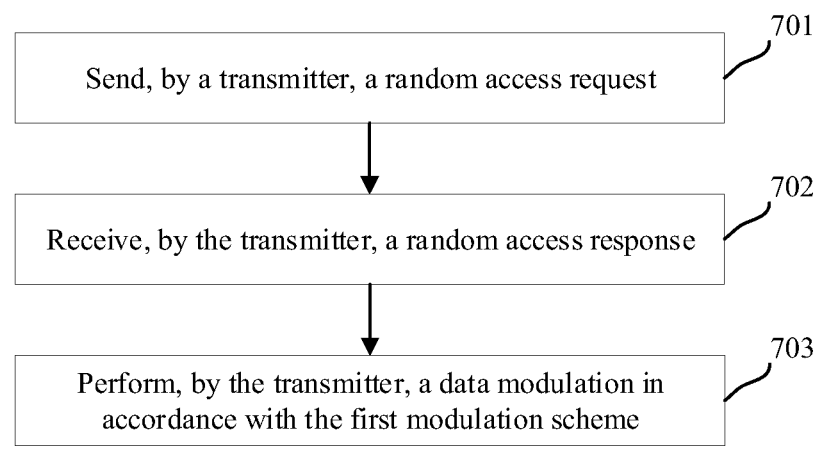
FIG. 7 illustrates a flow chart of a data transmission method according to an example.

FIG. 7 illustrates a flow chart of a data transmission method according to an example. This method may be performed by a terminal. The terminal may be the one in the communication system illustrated in FIG. 1, such as the MTC device or the NB-IoT device. As illustrated in FIG. 7, the method includes the following steps.

At step 701, a transmitter sends a random access request. The transmitter supports a first modulation scheme and a second modulation scheme. The second modulation scheme includes a high-order modulation scheme whose modulation order is higher than the modulation order of the first modulation scheme.

At step 702, the transmitter receives a random access response.

At step 703, the transmitter performs a data modulation in accordance with the first modulation scheme.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

In one or more examples, the first modulation scheme includes at least one of: a quadrature phase shift keying modulation scheme or a binary phase shift keying modulation scheme; and the second modulation scheme includes at least one of: a 16-quadrature amplitude modulation scheme or a 64-quadrature amplitude modulation scheme.

Alternatively or additionally, the method further includes that: the transmitter transmits modulated data to a receiver.

In one or more examples, the step that the transmitter transmits the modulated data to the receiver includes that: the transmitter transmits the modulated data to the receiver through MSG3.

It should be noted that the aforementioned steps 701-703 and the above alternative or additional steps may be combined arbitrarily.

Figure 8:
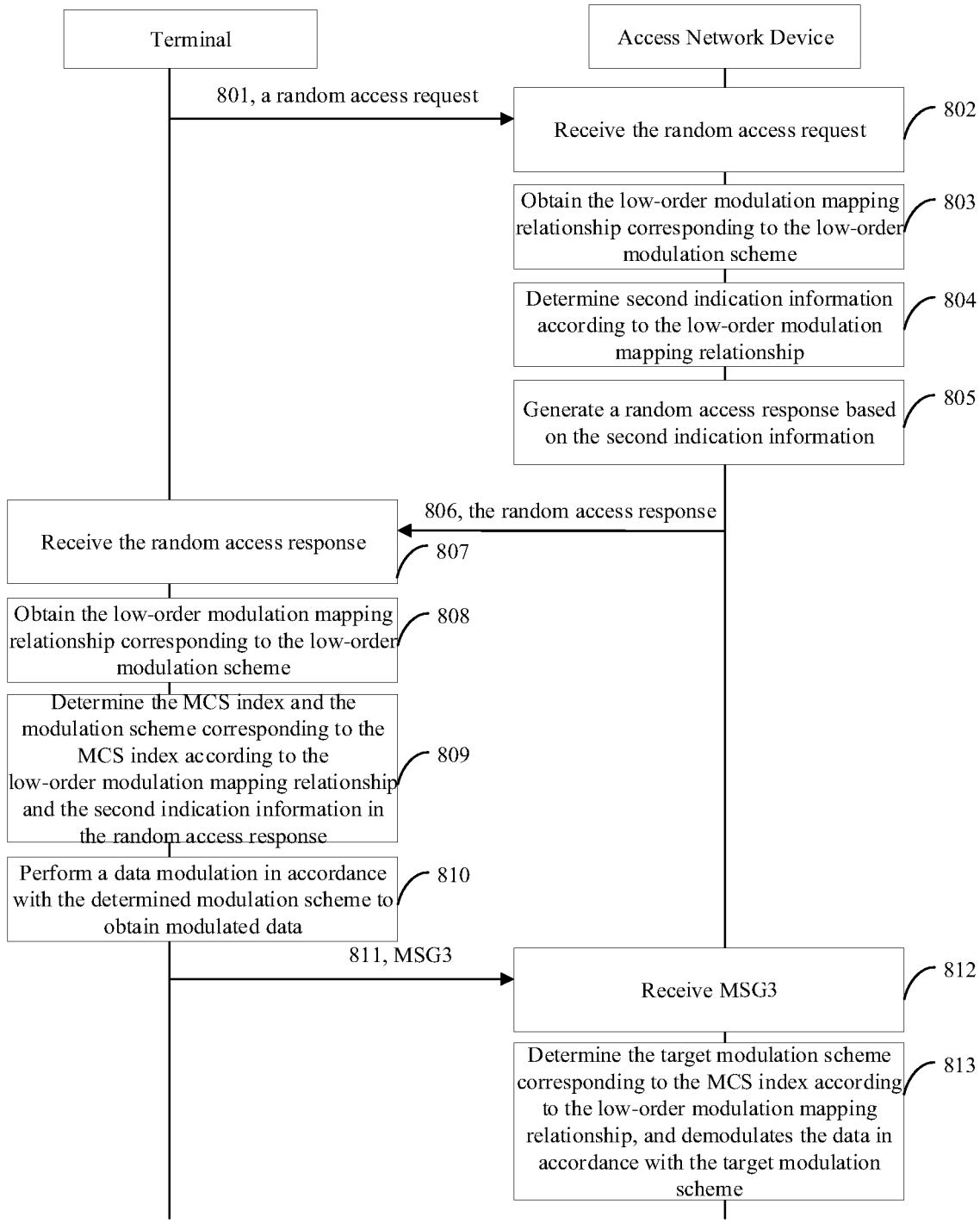
FIG. 8 illustrates a flow chart of a data transmission method according to an example.

FIG. 8 illustrates a flow chart of a data transmission method according to an example. This method is performed by both the access network device and the terminal. The terminal may be the one in the communication system illustrated in FIG. 1, such as the MTC device and the NB-IoT device. The terminal supports both a first modulation scheme and a second modulation scheme. The related contents of the first modulation scheme and the second modulation scheme may refer to the example described in FIG. 4, and their detailed descriptions are omitted here. For ease of description, in the example illustrated in FIG. 8, the first modulation scheme is called a low-order modulation scheme, and the second modulation scheme is called a high-order modulation scheme. As illustrated in FIG. 8, the method includes the following steps.

At step 801, the terminal sends a random access request.

The terminal has stored a high-order modulation mapping relationship corresponding to the high-order modulation scheme and a low-order modulation mapping relationship corresponding to the low-order modulation scheme. The related contents of the high-order modulation mapping relationship and the low-order modulation mapping relationship may refer to step 403, which will not be repeated here.

At step 802, the access network device receives the random access request.

At step 803, the access network device obtains the low-order modulation mapping relationship corresponding to the low-order modulation scheme.

The access network device has stored the same high-order modulation mapping relationship and low-order modulation mapping relationship as the terminal.

At step 804, the access network device determines second indication information according to the low-order modulation mapping relationship.

The second indication information indicates an MCS index.

At step 805, the access network device generates a random access response according to the second indication information.

The random access response carries the second indication information.

At step 806, the access network device sends the random access response.

At step 807, the terminal receives the random access response.

At step 808, the terminal obtains the low-order modulation mapping relationship corresponding to the low-order modulation scheme.

As described above, the terminal has stored the low-order modulation mapping relationship and the high-order modulation mapping relationship. In this example, after receiving the random access response, the terminal acquires the low-order modulation mapping relationship when there is data to be transmitted.

At step 809, the terminal determines the MCS index and the modulation scheme corresponding to the MCS index according to the low-order modulation mapping relationship and the second indication information in the random access response.

Alternatively or additionally, the TBS index corresponding to the MCS index may also be determined according to the low-order modulation mapping relationship.

At step 810, the terminal performs a data modulation in accordance with the determined modulation scheme to obtain modulated data.

Alternatively or additionally, it may also include the following steps before step 810: the terminal determines a TBS according to the TBS index; and the terminal performs channel coding based on the TBS and the MCS indicated by the MCS index.

At step 811, the terminal sends MSG3 to the access network device.

The MSG3 includes modulated data. After the transmission is successful, the terminal goes idle or inactive.

At step 812, the access network device receives MSG3.

At step 813, the access network device demodulates the data in MSG3 according to a target modulation mapping relationship.

In the step 813, the access network device determines the target modulation scheme corresponding to the MCS index according to the low-order modulation mapping relationship, and demodulates the data in accordance with the target modulation scheme.

Alternatively or additionally, it may also include the following steps before step 813: the terminal determines a TBS according to the TBS index; and the terminal performs channel encoding based on the TBS and the MCS indicated by the MCS index.

When the terminal supporting both the high-order modulation scheme and the low-order modulation scheme performs the data transmission, the default is to adopt the low-order modulation scheme, so as to keep consistent with the modulation scheme adopted by the access network device, which can avoid data transmission failure due to inconsistent modulation schemes adopted between the access network device and the terminal. In addition, the access network device may follow the current protocols, which is convenient and simple to be implemented.

Figure 9:
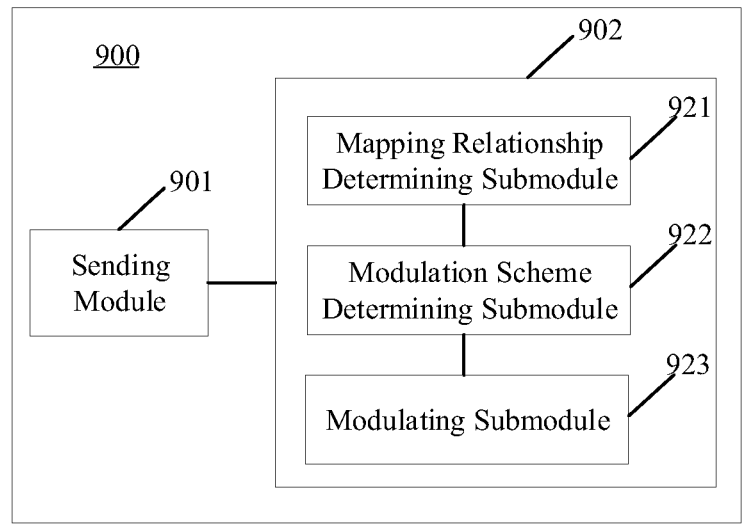
FIG. 9 illustrates a schematic structural diagram of a data transmission apparatus according to an example.

FIG. 9 illustrates a schematic structural diagram of a data transmission apparatus 900 according to an example. The apparatus has functions for implementing the access network device in the above method examples, and these functions may be worked by hardware, or by corresponding software executed by the hardware. As illustrated in FIG. 9, the apparatus 900 includes: a sending module 901 and a modulation module 902.

The sending module 901 is configured to send a random access request by using a first random access resource. A transmitter supports a first modulation scheme and a second modulation scheme, the second modulation scheme includes a high-order modulation scheme whose modulation order is higher than the modulation order of the first modulation scheme, and the first random access resource is configured to a transmitter supporting the second modulation scheme.

The modulating module 902 is configured to perform a data modulation in accordance with a target modulation scheme. The modulation is performed under a direction of a received random access response, and the target modulation scheme is one of the first modulation scheme and the second modulation scheme.

Alternatively or additionally, the sending module 901 is configured to send the random access request by using the first random access resource in response to determining by the transmitter that a channel quality meets a channel quality requirement.

Alternatively or additionally, the sending module 901 is configured to send the random access request by using the first random access resource in response to determining that an RSRP of the transmitter is higher than a threshold; or send the random access request by using the first random access resource in response to determining that a PRACH coverage enhancement level of the transmitter belongs to one or more target levels.

Alternatively or additionally, the first random access resource includes at least one of: a time resource, a frequency resource, or a code domain resource.

Alternatively or additionally, the sending module 901 is further configured to transmit modulated data to a receiver.

Alternatively or additionally, the sending module 901 is configured to transmit the modulated data to the receiver through MSG3.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

Alternatively or additionally, the random access response includes first indication information and second indication information. The first indication information indicates a target mapping relationship that is the first mapping relationship or the second mapping relationship, and the second indication information indicates the MCS index determined according to the target mapping relationship.

Alternatively or additionally, the target modulation scheme is the second modulation scheme, and the random access response includes second indication information that indicates the MCS index determined according to the second mapping relationship.

Alternatively or additionally, the modulating module 902 includes: a mapping relationship determining submodule 921 that is configured to determine the target mapping relationship corresponding to the target modulation scheme; a modulation scheme determining submodule 922 that is configured to determine the target modulation scheme based on the target mapping relationship and the MCS index; and a modulating submodule 923 that is configured to perform the data modulation in accordance with the target modulation scheme.

Alternatively or additionally, the apparatus further includes: a receiving module that is configured to receive configuration information sent by the aforementioned receiver. The configuration information indicates the first random access resource.

Alternatively or additionally, the receiving module is configured to: receive a broadcast message carrying the configuration information and sent by the receiver.

Alternatively or additionally, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

Figure 10:
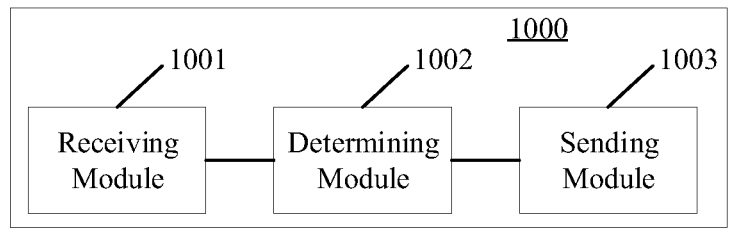
FIG. 10 illustrates a schematic structural diagram of a data transmission apparatus according to an example.

FIG. 10 illustrates a schematic structural diagram of a data transmission apparatus 1000 according to an example. The apparatus has functions for implementing the access network device in the above method examples, and these functions may be worked by hardware, or by corresponding software executed by the hardware. As illustrated in FIG. 10, the apparatus 1000 includes: a receiving module 1001, a determining module 1002, and a sending module 1003.

The receiving module 1001 is configured to receive a random access request.

The determining module 1002 is configured to determine a target modulation scheme based on a random access resource used by the random access request. The target modulation scheme is one of a first modulation scheme and a second modulation scheme, and the second modulation scheme comprises a higher-order modulation scheme whose modulation order is higher than the modulation order of the first modulation scheme.

The sending module 1003 is configured to send a random access response to a transmitter based on the target modulation scheme.

Alternatively or additionally, the determining module 1002 is configured to determine the first modulation scheme or the second modulation scheme as the target modulation scheme in response to determining that the random access resource used by the random access request is a first random access resource; or determine the first modulation scheme as the target modulation scheme in response to determining that the random access resource used by the random access request is a second random access resource.

The first random access resource is configured to a transmitter supporting the second modulation scheme, and the second random access resource is configured to the transmitter but other than the first random access resource.

Alternatively or additionally, the receiving module 1001 is further configured to receive modulated data.

Alternatively or additionally, the receiving module is further configured to receive the modulated data sent through MSG3.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

Alternatively or additionally, the random access resource used by the random access request is the first random access resource, and the random access response includes first indication information and second indication information. The first indication information indicates a target mapping relationship that is the first mapping relationship or the second mapping relationship, and the second indication information indicates the MCS index determined according to the target mapping relationship.

Alternatively or additionally, the random access resource used by the random access request is the first random access resource, the target modulation scheme is the second modulation scheme, and the random access response includes second indication information that indicates the MCS index determined according to the second mapping relationship.

Alternatively or additionally, the sending module 1003 is configured to send the random access response in accordance with the first modulation scheme, or send the random access response in accordance with the second modulation scheme.

Alternatively or additionally, the sending module 1003 is further configured to send configuration information that indicates the first random access resource.

Alternatively or additionally, the sending module 1003 is further configured to send a broadcast message carrying the configuration information.

Alternatively or additionally, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

Figure 11:
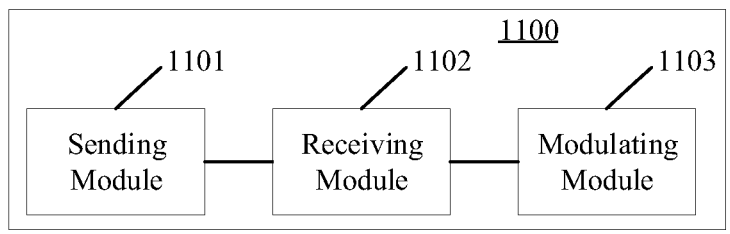
FIG. 11 illustrates a schematic structural diagram of a data transmission apparatus according to an example.

FIG. 11 illustrates a schematic structural diagram of a data transmission apparatus 1100 according to an example. The apparatus has functions for implementing the terminal in the above method examples, and these functions may be worked by hardware, or by corresponding software executed by the hardware. As illustrated in FIG. 11, the apparatus 1100 includes: a sending module 1101, a receiving module 1102, and a modulating module 1103.

The sending module 1101 is configured to send a random access request. A transmitter supports a first modulation scheme and a second modulation scheme, and the second modulation scheme includes a high-order modulation scheme whose modulation order is higher than the modulation order of the first modulation scheme.

The receiving module 1102 is configured to receive a random access response by the transmitter.

The modulating module 1103 is configured to perform a data modulation in accordance with the first modulation scheme.

Alternatively or additionally, the first modulation scheme is included in a first mapping relationship and the second modulation scheme is included in a second mapping relationship. Both the first mapping relationship and the second mapping relationship are among MCS indexes, modulation schemes and TBS indexes.

Alternatively or additionally, the first modulation scheme includes at least one of: a quadrature phase shift keying modulation scheme or a binary phase shift keying modulation scheme, and
  the second modulation scheme includes at least one of: a 16-quadrature amplitude modulation scheme or a 64-quadrature amplitude modulation scheme.

Alternatively or additionally, the sending module 1101 is further configured to transmit modulated data to a receiver.

Alternatively or additionally, the sending module 1101 is also configured to transmit the modulated data to the receiver through MSG3.

Figure 12:
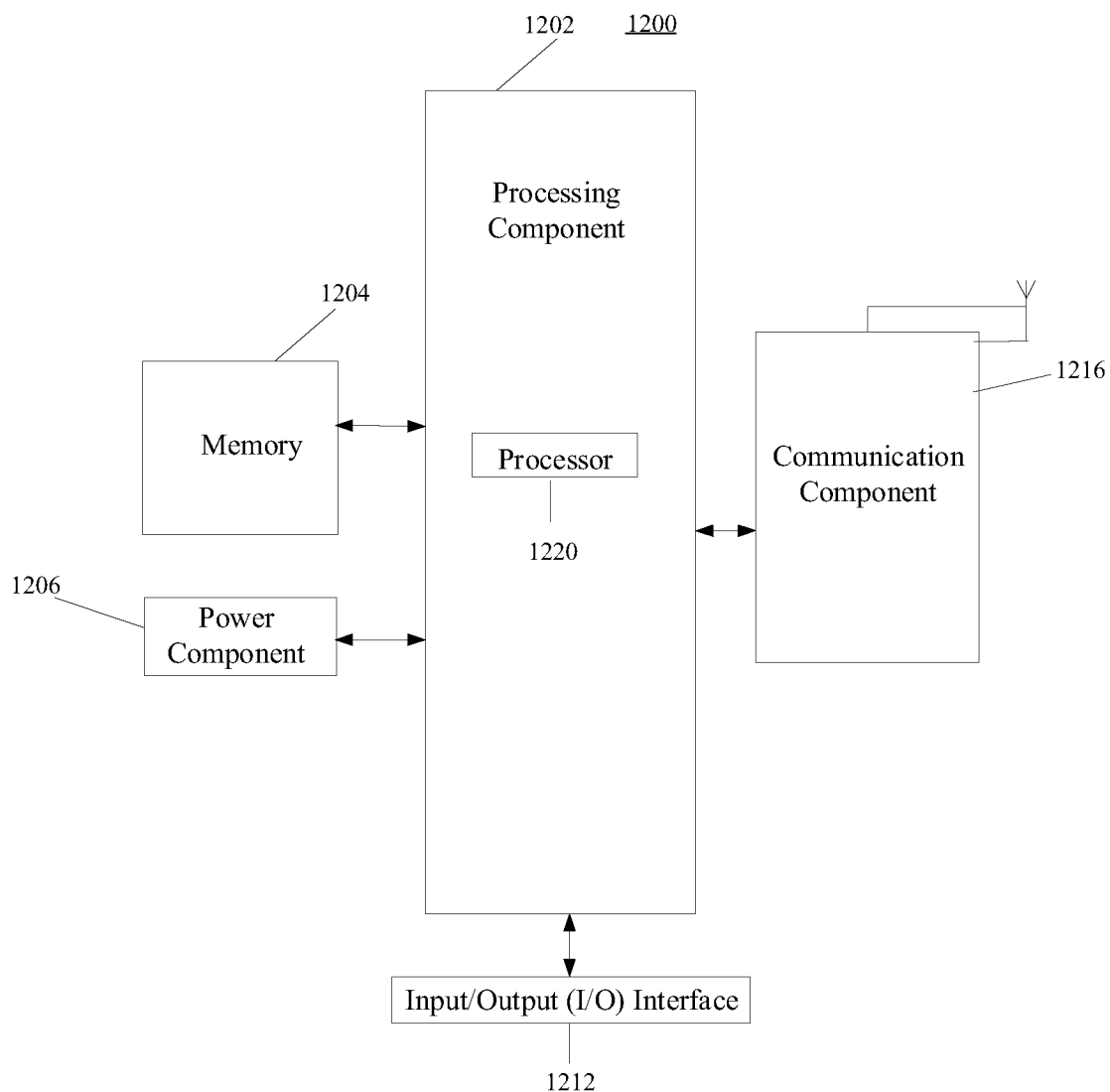
FIG. 12 illustrates a block diagram of a data transmission apparatus according to an example.

FIG. 12 illustrates a block diagram of a data transmission apparatus 1200 according to an example. The apparatus 1200 may be the aforementioned access network device. Referring to FIG. 12, the data transmission apparatus 1200 may include one or more of the following components: a processing component 1202, a memory 1204, a power component 1206, an input/output (I/O) interface 1212, and a communication component 1216.

The processing component 1202 generally controls the overall operations of the data transmission apparatus 1200, such as operations associated with display, phone calls, data communications, camera operations, and recording operations. The processing element 1202 may include one or more processors 1220 to execute instructions to complete all or a part of the steps of the above methods. In addition, the processing component 1202 may include one or more modules which facilitate the interaction between the processing component 1202 and other components.

The memory 1204 is configured to store various types of data to support the operations of the data transmission apparatus 1200. The memory 1204 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power component 1206 provides power to various components of the data transmission apparatus 1200. The power component 1206 may include a power management system, one or more power supplies, and other components associated with generating, managing, and distributing power for the data transmission apparatus 1200.

The I/O interface 1212 provides an interface between the processing component 1202 and a peripheral interface module. The above peripheral interface module may be a keyboard, a click wheel, buttons, or the like. These buttons may include but not be limited to a home button, a volume button, a start button and a lock button.

The communication component 1216 is configured to facilitate a wireless communication between the access network device and other devices. In one or more examples of the present disclosure, the communication component 1216 may provide a wireless network based on a communication standard, such as 2G, 3G, 4G, 5G or a combination thereof, so as to connect with a terminal device.

In one or more examples, the data transmission apparatus 1200 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronics to perform the foregoing data transmission methods.

In one or more examples, there is also provided a non-transitory computer-readable storage medium including instructions, such as the memory 1204 including instructions, which can be executed by the one or more processors 1220 of the data transmission apparatus 1200 to perform the foregoing data transmission methods. For example, the non-transitory computer-readable storage medium may be an ROM, a random access memory (RAM), a CD-ROM, a magnetic tape, a floppy disk, an optical data storage device, and the like.

Figure 13:
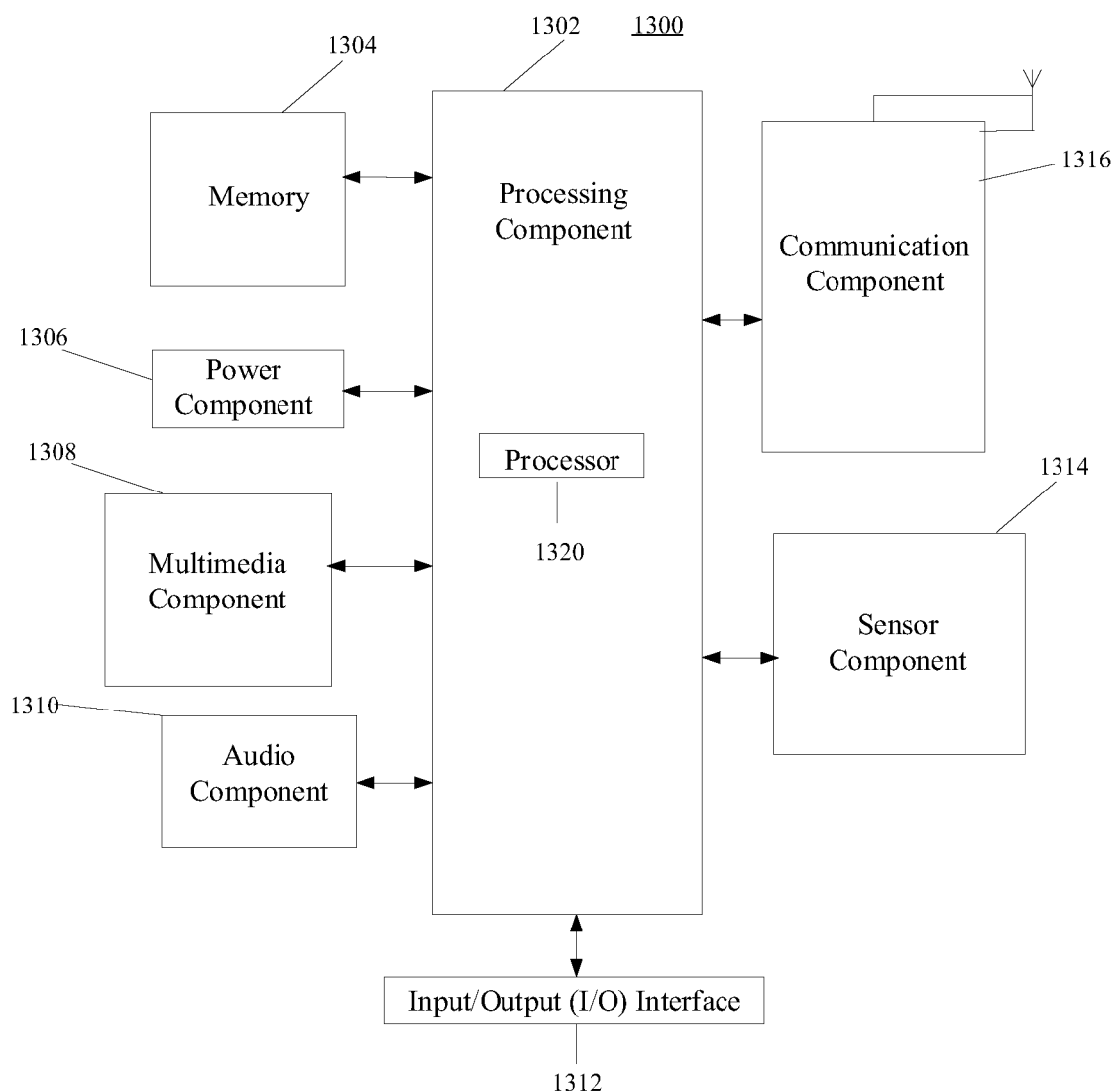
FIG. 13 illustrates a block diagram of a data transmission apparatus according to an example.

FIG. 13 illustrates a block diagram of a data transmission apparatus 1300 according to an example. The apparatus 1300 may be the aforementioned terminal. Referring to FIG. 13, the data transmission apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 generally controls the overall operations of the data transmission apparatus 1300, such as operations associated with display, phone calls, data communications, camera operations, and recording operations. The processing element 1302 may include one or more processors 1320 to execute instructions to complete all or a part of the steps of the above methods. In addition, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operations of the data transmission apparatus 1300. Examples of such data include instructions for any application or method operated on the data transmission apparatus 1300, contact data, phonebook data, messages, pictures, videos, and the like. The memory 1304 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power component 1306 provides power to various components of the data transmission apparatus 1300. The power component 1306 may include a power management system, one or more power supplies, and other components associated with generating, managing, and distributing power for the data transmission apparatus 1300.

The multimedia component 1308 includes a screen providing an output interface between the data transmission apparatus 1300 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 1308 includes a front camera and/or a rear camera. The front camera and/or rear camera may receive external multimedia data when the data transmission apparatus 1300 is in an operating mode, such as a photographing mode or a video mode. Each front camera and rear camera may be a fixed optical lens system or have focal length and optical zooming capability.

The audio component 1310 is configured to output and/or input an audio signal. For example, the audio component 1310 includes a microphone (MIC) that is configured to receive an external audio signal when the data transmission apparatus 1300 is in an operating mode, such as a call mode, a recording mode, and a voice recognition mode. The received audio signal may be further stored in memory 1304 or transmitted via communication component 1316. In some examples, the audio component 1310 also includes a speaker for outputting an audio signal.

The I/O interface 1312 provides an interface between the processing component 1302 and a peripheral interface module. The above peripheral interface module may be a keyboard, a click wheel, buttons, or the like. These buttons may include but not be limited to a home button, a volume button, a start button and a lock button.

The sensor component 1314 includes one or more sensors to provide the data transmission apparatus 1300 with status assessments in various aspects. For example, the sensor component 1314 may detect an open/closed state of the data transmission apparatus 1300 and a relative positioning of components such as the display and keypad of the data transmission apparatus 1300. The sensor component 1314 may also detect a change in position of the data transmission apparatus 1300 or a component of the data transmission apparatus 1300, the presence or absence of user contact with the data transmission apparatus 1300, orientation or acceleration/deceleration of the data transmission apparatus 1300, and temperature change of the data transmission apparatus 1300. The sensor component 1314 may include a proximity sensor configured to detect the presence of a nearby object without any physical contact. The sensor component 1314 may also include a light sensor, such as a complementary metal oxide semiconductor (CMOS) or charge coupled device (CCD) image sensor, for being applied in imaging applications. In some examples, the sensor component 1314 may also include an acceleration sensor, a gyro sensor, a magnetic sensor, a pressure sensor, or a temperature sensor.

The communication component 1316 is configured to facilitate a wireless communication between the data transmission apparatus 1300 and other devices. In one or more examples of the present disclosure, the communication component 1316 may access a wireless network based on a communication standard, such as 2G, 3G, 4G, 5G or a combination thereof, so as to achieve a data transmission. In one example, the communication component 1316 receives broadcast signals or broadcast related information from an external broadcast management system via a broadcast channel. Alternatively or additionally, the communication component 1316 further includes a Near Field Communications (NFC) module.

In one or more examples, the data transmission apparatus 1300 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronics to perform the foregoing data transmission methods.

In one or more examples, there is also provided a non-transitory computer-readable storage medium including instructions, such as the memory 1304 including instructions, which can be executed by the one or more processors 1320 of the data transmission apparatus 1300 to perform the foregoing data transmission methods. For example, the non-transitory computer-readable storage medium may be an ROM, a random access memory (RAM), a CD-ROM, a magnetic tape, a floppy disk, an optical data storage device, and the like.

One example of the present disclosure also provides a communication system that includes an access network device and a terminal. The access network device is shown as the data transmission apparatus provided in the example illustrated in FIG. 12. The terminal is shown as the data transmission apparatus provided by the example illustrated in FIG. 13.

The solutions provided according to the embodiments of the present disclosure may obtain the following beneficial effects.

By setting a first random access resource dedicated to a terminal supporting a high-order modulation scheme, a access network device can learn a capability of the terminal based on the random access resource that is used by the terminal for sending a random access request, and then select, based on the capability of the terminal, a corresponding modulation scheme to perform a data transmission, so as to avoid data transmission failure due to inconsistent modulation schemes adopted between the access network device and the terminal.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

According to a first aspect of the embodiments of the present disclosure, a data transmission method is provided. The method includes:

sending, by a transmitter, a random access request by using a first random access resource, where the transmitter supports a first modulation scheme and a second modulation scheme, the second modulation scheme includes a high-order modulation scheme whose modulation order is higher than the modulation order of the first modulation scheme, and the first random access resource is configured to the transmitter supporting the second modulation scheme; and performing, by the transmitter, a data modulation in accordance with a target modulation scheme, where the modulation is performed under a direction of a received random access response, and the target modulation scheme is one of the first modulation scheme and the second modulation scheme.

Alternatively or additionally, sending, by the transmitter, the random access request by using the first random access resource includes:

sending, by the transmitter, the random access request by using the first random access resource in response to determining by the transmitter that a channel quality meets a channel quality requirement.

Alternatively or additionally, sending, by the transmitter, the random access request by using the first random access resource in response to determining by the transmitter that the channel quality meets the channel quality requirement includes:

sending, by the transmitter, the random access request by using the first random access resource in response to determining that a reference signal received power (RSRP) of the transmitter is higher than a threshold; or sending, by the transmitter, the random access request by using the first random access resource in response to determining that a physical random access channel (PRACH) coverage enhancement level of the transmitter belongs to one or more target levels.

Alternatively or additionally, the first random access resource includes at least one of: a time resource, a frequency resource, or a code domain resource.

Alternatively or additionally, the method further includes: transmitting, by the transmitter, modulated data to a receiver.

In one or more examples, the transmitter transmits the modulated data to the receiver through Message 3 (MSG3).

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

In a possible implementation, the random access response includes first indication information and second indication information, where the first indication information indicates a target mapping relationship that is the first mapping relationship or the second mapping relationship, and the second indication information indicates the MCS index determined according to the target mapping relationship.

In a possible implementation, the target modulation scheme is the second modulation scheme, and the random access response includes second indication information that indicates the MCS index determined according to the second mapping relationship.

Alternatively or additionally, performing, by the transmitter, the data modulation in accordance with the target modulation scheme includes:
  determining, by the transmitter, the target mapping relationship corresponding to the target modulation scheme;
  determining, by the transmitter, the target modulation scheme based on the target mapping relationship and the MCS index; and
  performing, by the transmitter, the data modulation in accordance with the target modulation scheme.

Alternatively or additionally, the method further includes:
  receiving, by the transmitter, configuration information sent by a receiver, where the configuration information indicates the first random access resource.

In one or more examples, receiving, by the transmitter, the configuration information sent by the receiver includes:
  receiving, by the transmitter, a broadcast message carrying the configuration information and sent by the receiver.

In one or more examples, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

According to a second aspect of the embodiments of the present disclosure, a data transmission method is provided. The method includes:
  receiving, by a receiver, a random access request;
  determining, by the receiver, a target modulation scheme based on a random access resource used by the random access request, where the target modulation scheme is one of a first modulation scheme and a second modulation scheme, and the second modulation scheme includes a higher-order modulation scheme whose modulation order is higher than the modulation order of the first modulation scheme; and
  sending, by the receiver, the random access response based on the target modulation scheme.

Alternatively or additionally, determining, by the receiver, the target modulation scheme based on the random access resource used by the random access request includes:
  determining, by the receiver, the first modulation scheme or the second modulation scheme as the target modulation scheme in response to determining that the random access resource used by the random access request is a first random access resource; or
  determining, by the receiver, the first modulation scheme as the target modulation scheme in response to determining that the random access resource used by the random access request is a second random access resource;
  where the first random access resource is configured to a transmitter supporting the second modulation scheme, and the second random access resource is configured to the transmitter but other than the first random access resource.

Alternatively or additionally, the method further includes: receiving, by the receiver, modulated data.

In one or more examples, receiving, by the receiver, the modulated data includes:
  receiving, by the receiver, the modulated data sent through Message 3 (MSG3).

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

In a possible implementation, the random access resource used by the random access request is a first random access resource, and the random access response includes first indication information and second indication information, where the first indication information indicates a target mapping relationship that is the first mapping relationship or the second mapping relationship, and the second indication information indicates the MCS index determined according to the target mapping relationship.

In a possible implementation, the random access resource used by the random access request is a first random access resource, the target modulation scheme is the second modulation scheme, and the random access response includes second indication information that indicates the MCS index determined according to the second mapping relationship.

Alternatively or additionally, sending, by the receiver, the random access response includes:
  sending, by the receiver, the random access response in accordance with the first modulation scheme;
  or
  sending, by the receiver, the random access response in accordance with the second modulation scheme.

Alternatively or additionally, the method further includes:
  sending, by the receiver, configuration information that indicates the first random access resource.

In one or more examples, sending, by the receiver, the configuration information includes:
  sending, by the receiver, a broadcast message carrying the configuration information.

In one or more examples, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

According to a third aspect of the embodiments of the present disclosure, a data transmission method is provided. The method includes:
  sending, by a transmitter, a random access request, where the transmitter supports a first modulation scheme and a second modulation scheme, and the second modulation scheme includes a high-order modulation scheme whose modulation order is higher than the modulation order of the first modulation scheme;
  receiving, by the transmitter, a random access response; and performing, by the transmitter, a data modulation in accordance with the first modulation scheme.

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

In one or more examples, the first modulation scheme includes at least one of: a quadrature phase shift keying modulation scheme or a binary phase shift keying modulation scheme; and the second modulation scheme includes at least one of: a 16-quadrature amplitude modulation scheme or a 64-quadrature amplitude modulation scheme.

Alternatively or additionally, the method further includes: transmitting, by the transmitter, modulated data to a receiver.

In one or more examples, transmitting the modulated data to the receiver includes:

transmitting, by the transmitter, the modulated data to the receiver through Message 3 (MSG3).

According to a fourth aspect of the embodiments of the present disclosure, t a data transmission apparatus is provided. The apparatus includes:

a sending module, configured to send a random access request by using a first random access resource, where a transmitter supports a first modulation scheme and a second modulation scheme, the second modulation scheme includes a high-order modulation scheme whose modulation order is higher than the modulation order of the first modulation scheme, and the first random access resource is configured to the transmitter supporting the second modulation scheme; and a modulating module, configured to perform a data modulation in accordance with a target modulation scheme, where the modulation is performed under a direction of a received random access response, and the target modulation scheme is one of the first modulation scheme and the second modulation scheme.

Alternatively or additionally, the sending module is configured to send the random access request by using the first random access resource in response to determining by the transmitter that a channel quality meets a channel quality requirement.

Alternatively or additionally, the sending module is configured to:

send the random access request by using the first random access resource in response to determining that a reference signal received power (RSRP) of the transmitter is higher than a threshold; or send the random access request by using the first random access resource in response to determining that a physical random access channel (PRACH) coverage enhancement level of the transmitter belongs to one or more target levels.

Alternatively or additionally, the first random access resource includes at least one of: a time resource, a frequency resource, or a code domain resource.

Alternatively or additionally, the sending module is further configured to transmit modulated data to a receiver.

Alternatively or additionally, the sending module is configured to transmit the modulated data to the receiver through Message 3 (MSG3).

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

Alternatively or additionally, the random access response includes first indication information and second indication information, where the first indication information indicates a target mapping relationship that is the first mapping relationship or the second mapping relationship, and the second indication information indicates the MCS index determined according to the target mapping relationship.

Alternatively or additionally, the target modulation scheme is the second modulation scheme, and the random access response includes second indication information that indicates the MCS index determined according to the second mapping relationship.

Alternatively or additionally, the modulating module includes:

a mapping relationship determining submodule, configured to determine the target mapping relationship corresponding to the target modulation scheme;

a modulation scheme determining submodule, configured to determine the target modulation scheme based on the target mapping relationship and the MCS index; and a modulating submodule, configured to perform the data modulation in accordance with the target modulation scheme.

Alternatively or additionally, the apparatus further includes:

a receiving module, configured to receive configuration information sent by a receiver, where the configuration information indicates the first random access resource.

Alternatively or additionally, the receiving module is configured to receive a broadcast message carrying the configuration information and sent by the receiver.

Alternatively or additionally, the first modulation scheme includes at least one of: a quadrature phase shift keying modulation scheme or a binary phase shift keying modulation scheme, and the second modulation scheme includes at least one of: a 16-quadrature amplitude modulation scheme or a 64-quadrature amplitude modulation scheme.

According to a fifth aspect of the embodiments of the present disclosure, a data transmission apparatus is provided. The apparatus includes:

a receiving module, configured to receive a random access request;

a determining module, configured to determine a target modulation scheme based on a random access resource used by the random access request, where the target modulation scheme is one of a first modulation scheme and a second modulation scheme, and the second modulation scheme includes a higher-order modulation scheme whose modulation order is higher than the modulation order of the first modulation scheme; and a sending module, configured to send a random access response based on the target modulation scheme.

Alternatively or additionally, the determining module is configured to determine the first modulation scheme or the second modulation scheme as the target modulation scheme in response to determining that the random access resource used by the random access request is a first random access resource; or determine the first modulation scheme as the target modulation scheme in response to determining that the random access resource used by the random access request is a second random access resource;

where the first random access resource is configured to a transmitter supporting the second modulation scheme, and the second random access resource is configured to the transmitter but other than the first random access resource.

Alternatively or additionally, the receiving module is further configured to receive modulated data.

Alternatively or additionally, the receiving module is further configured to receive the modulated data sent through Message 3 (MSG3).

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

Alternatively or additionally, the random access resource used by the random access request is a first random access resource, and the random access response includes first indication information and second indication information, where the first indication information indicates a target mapping relationship that is the first mapping relationship or the second mapping relationship, and the second indication information indicates the MCS index determined according to the target mapping relationship.

Alternatively or additionally, the random access resource used by the random access request is a first random access resource, the target modulation scheme is the second modulation scheme, and the random access response includes second indication information that indicates the MCS index determined according to the second mapping relationship.

Alternatively or additionally, the sending module is configured to send the random access response in accordance with the first modulation scheme, or send the random access response in accordance with the second modulation scheme.

Alternatively or additionally, the sending module is further configured to send configuration information that indicates the first random access resource.

Alternatively or additionally, the sending module is further configured to send a broadcast message carrying the configuration information.

Alternatively or additionally, the first modulation scheme includes at least one of: a quadrature phase shift keying modulation scheme or a binary phase shift keying modulation scheme, and
the second modulation scheme includes at least one of: a 16-quadrature amplitude modulation scheme or a 64-quadrature amplitude modulation scheme.

According to a sixth aspect of the embodiments of the present disclosure, a data transmission apparatus is provided. The apparatus includes:

a sending module, configured to send a random access request, where a transmitter supports a first modulation scheme and a second modulation scheme, and the second modulation scheme includes a high-order modulation scheme whose modulation order is higher than the modulation order of the first modulation scheme;

a receiving module, configured to receive a random access response by the transmitter; and a modulating module, configured to perform a data modulation in accordance with the first modulation scheme.

Alternatively or additionally, the first modulation scheme is included in a first mapping relationship and the second modulation scheme is included in a second mapping relationship, where both the first mapping relationship and the second mapping relationship are among modulation and coding scheme (MCS) indexes, modulation schemes and TBS indexes.

Alternatively or additionally, the first modulation scheme includes at least one of: a quadrature phase shift keying modulation scheme or a binary phase shift keying modulation scheme, and
the second modulation scheme includes at least one of: a 16-quadrature amplitude modulation scheme or a 64-quadrature amplitude modulation scheme.

Alternatively or additionally, the sending module is further configured to transmit modulated data to a receiver.

Alternatively or additionally, the sending module is further configured to transmit the modulated data to the receiver through Message 3 (MSG3).

According to a seventh aspect of the embodiments of the present disclosure, a data transmission apparatus is provided. The apparatus includes: one or more processors; and a memory for storing executable instructions for the one or more processors; where the one or more processors are configured to load and execute the executable instructions to implement the data transmission method provided in the foregoing first, second or third aspect.

According to an eighth aspect of the embodiments of the present disclosure, a computer-readable storage medium is provided. When instructions in the computer-readable storage medium are executed by one or more processors, the data transmission method as described in the first, second or third aspect can be performed.

The invention claimed is:

1. A method for data transmission, the method comprising:

sending, by a transmitter, a random access request by using a first-random access resource, wherein the random access resource comprises a first random access resource or a second random access resource, the first random access resource is configured to a transmitter supporting a first modulation scheme and a second modulation scheme, and the second random access resource is configured to a transmitter supporting the first modulation scheme but other than the first random access resource;

receiving, by the transmitter, a random access response, wherein the random access response is sent based on a target modulation scheme, the target modulation scheme is one of the first modulation scheme and the second modulation scheme, the second modulation scheme comprises a high-order modulation scheme whose modulation order is higher than the modulation order of the first modulation scheme, and the target modulation scheme is determined based on the random access resource used by the random access request, and wherein the first modulation scheme or the second modulation scheme is determined as the target modulation scheme in accordance with determining that the random access resource used by the random access request is the first random access resource, and the first modulation scheme is determined as the target modulation scheme in accordance with determining that the random access resource used by the random access request is the second random access resource;

performing, by the transmitter, a data modulation in accordance with the target modulation scheme; and transmitting, by the transmitter, modulated data to a receiver.

2. The method according to claim 1, wherein sending, by the transmitter, the random access request by using the first-random access resource comprises:
  sending, by the transmitter, the random access request by using the first random access resource in accordance with to determining by the transmitter that a channel quality meets a channel quality requirement.

3. The method according to claim 2, wherein sending, by the transmitter, the random access request by using the first random access resource in accordance with to determining by the transmitter that the channel quality meets the channel quality requirement comprises:
  sending, by the transmitter, the random access request by using the first random access resource in accordance with to determining that a reference signal received power (RSRP) of the transmitter is higher than a threshold; or
  sending, by the transmitter, the random access request by using the first random access resource in accordance with to determining that a physical random access channel (PRACH) coverage enhancement level of the transmitter belongs to one or more target levels.

4. The method according to claim 1, wherein the first random access resource comprises at least one of: a time resource, a frequency resource, or a code domain resource.

5. The method according to claim 1, wherein transmitting, by the transmitter, the modulated data to the receiver comprises:
  transmitting, by the transmitter, the modulated data to the receiver through Message 3 (MSG3).

6. The method according to claim 1, wherein the first modulation scheme is comprised in a first mapping relationship and the second modulation scheme is comprised in a second mapping relationship, wherein both the first mapping relationship and the second mapping relationship are among modulation and coding scheme (MCS) indexes, modulation schemes and TBS indexes;
  wherein the random access response comprises first indication information and second indication information, wherein the first indication information indicates a target mapping relationship that is the first mapping relationship or the second mapping relationship, and the second indication information indicates the MCS index determined according to the target mapping relationship; or
  wherein the target modulation scheme is the second modulation scheme, and the random access response comprises second indication information that indicates the MCS index determined according to the second mapping relationship.

7. The method according to claim 6, wherein performing, by the transmitter, the data modulation in accordance with the target modulation scheme comprises:
  determining, by the transmitter, the target mapping relationship corresponding to the target modulation scheme;
  determining, by the transmitter, the target modulation scheme based on the target mapping relationship and the MCS index; and
  performing, by the transmitter, the data modulation in accordance with the target modulation scheme.

8. The method according to claim 1, further comprising:
  receiving, by the transmitter, configuration information sent by the receiver, wherein the configuration information indicates the first random access resource.

9. The method according to claim 8, wherein receiving, by the transmitter, the configuration information sent by the receiver comprises:
  receiving, by the transmitter, a broadcast message carrying the configuration information and sent by the receiver.

10. The method according to claim 1, wherein
  the first modulation scheme comprises at least one of: a quadrature phase shift keying modulation scheme or a binary phase shift keying modulation scheme, and
  the second modulation scheme comprises at least one of: a 16-quadrature amplitude modulation scheme or a 64-quadrature amplitude modulation scheme.

11. A method for data transmission, the method comprising:
  receiving, by a receiver, a random access request;
  determining, by the receiver, a target modulation scheme based on a random access resource used by the random access request, wherein the target modulation scheme is one of a first modulation scheme and a second modulation scheme, and the second modulation scheme comprises a higher-order modulation scheme whose modulation order is higher than the modulation order of the first modulation scheme, and wherein determining, by the receiver, the target modulation scheme based on the random access resource used by the random access request comprises:
  determining, by the receiver, the first modulation scheme or the second modulation scheme as the target modulation scheme in accordance with determining that the random access resource used by the random access request is a first random access resource; or
  determining, by the receiver, the first modulation scheme as the target modulation scheme in accordance with determining that the random access resource used by the random access request is a second random access resource;
  wherein the first random access resource is configured to a transmitter supporting the first modulation scheme and the second modulation scheme, and the second random access resource is configured to a transmitter supporting the first modulation scheme but other than the first random access resource;
  sending, by the receiver, a random access response based on the target modulation scheme; and
  receiving, by the receiver, modulated data modulated by the transmitter in accordance with the target modulation scheme.

12. The method according to claim 11, wherein receiving, by the receiver, the modulated data comprises:
  receiving, by the receiver, the modulated data sent through Message 3 (MSG3).

13. The method according to claim 11, wherein the first modulation scheme is comprised in a first mapping relationship and the second modulation scheme is comprised in a second mapping relationship, wherein both the first mapping relationship and the second mapping relationship are among modulation and coding scheme (MCS) indexes, modulation schemes and TBS indexes;
  wherein the random access resource used by the random access request is a first random access resource, and the random access response comprises first indication information and second indication information, wherein the first indication information indicates a target mapping relationship that is the first mapping relationship or the second mapping relationship, and the second indication information indicates the MCS index determined according to the target mapping relationship; or wherein the random access resource used by the random access request is a first random access resource, the target modulation scheme is the second modulation scheme, and the random access response comprises second indication information that indicates the MCS index determined according to the second mapping relationship.

14. The method according to claim 11, wherein sending, by the receiver, the random access response comprises:

sending, by the receiver, the random access response in accordance with the first modulation scheme; or sending, by the receiver, the random access response in accordance with the second modulation scheme.

15. The method according to claim 11, further comprising:

sending, by the receiver, configuration information that indicates the first random access resource.

16. The method according to claim 15, wherein sending, by the receiver, the configuration information comprises:

sending, by the receiver, a broadcast message carrying the configuration information.

17. The method according to claim 11, wherein the first modulation scheme comprises at least one of: a quadrature phase shift keying modulation scheme or a binary phase shift keying modulation scheme; and the second modulation scheme comprises at least one of: a 16-quadrature amplitude modulation scheme or a 64-quadrature amplitude modulation scheme.

18. A data transmission apparatus, applicable to a receiver, comprising:

one or more processors; and a memory for storing executable instructions for the one or more processors;

wherein the executable instructions when collectively executed by the one or more processors, cause the data transmission apparatus to for perform the method according to claim 11.

19. The method according to claim 11, wherein the random access request is sent by the transmitter in accordance with a channel quality meeting a channel quality requirement, and wherein the channel quality meeting the channel quality requirement comprises:

a reference signal received power (RSRP) of the transmitter being higher than a threshold; or a physical random access channel (PRACH) coverage enhancement level of the transmitter belonging to one or more target levels.

20. A data transmission apparatus, comprising:

one or more processors; and a memory for storing executable instructions for the one or more processors;

wherein the one or more processors are collectively configured to:

send a random access request by using a random access resource, wherein the random access resource comprises a first random access resource or a second random access resource, the first random access resource is configured to a transmitter supporting a first modulation scheme and a second modulation scheme, and the second random access resource is configured to a transmitter supporting the first modulation scheme but other than the first random access resource;

receive a random access response, wherein the random access response is sent based on a target modulation scheme, the target modulation scheme is one of the first modulation scheme and the second modulation scheme, the second modulation scheme comprises a high-order modulation scheme whose modulation order is higher than the modulation order of the first modulation scheme, and the target modulation scheme is determined based on the random access resource used by the random access request, and wherein the first modulation scheme or the second modulation scheme is determined as the target modulation scheme in accordance with determining that the random access resource used by the random access request is the first random access resource, and the first modulation scheme is determined as the target modulation scheme in accordance with determining that the random access resource used by the random access request is the second random access resource;

perform a data modulation in accordance with the target modulation scheme; and transmit modulated data to a receiver.

* * * * *

UNITED STATES PATENT AND TRADEMARK OFFICE
CERTIFICATE OF CORRECTION

| | | |
|---|---|---|
| PATENT NO. | : 12,500,686 B2 | Page 1 of 1 |
| APPLICATION NO. | : 17/909137 | |
| DATED | : December 16, 2025 | |
| INVENTOR(S) | : Qin Mu | |

It is certified that error appears in the above-identified patent and that said Letters Patent is hereby corrected as shown below:

On the Title Page

On Page 2, item [56], Column 2, Line 4, delete "Interdigital," and insert -- InterDigital, --, therefor.

In the Specification

In Column 19, Line 12, delete "16 QAM," and insert -- 16QAM, --, therefor.

In the Claims

In Column 40, Line 36, in Claim 1, delete "first-random" and insert -- random --, therefor.
In Column 41, Line 3, in Claim 2, delete "first-random" and insert -- random --, therefor.
In Column 41, Line 6, in Claim 2, delete "with to" and insert -- with --, therefor.
In Column 41, Line 10, in Claim 3, delete "with to" and insert -- with --, therefor.
In Column 41, Line 15, in Claim 3, delete "with to" and insert -- with --, therefor.
In Column 41, Line 21, in Claim 3, delete "with to" and insert -- with --, therefor.
In Column 41, Line 67, in Claim 8, delete "first random" and insert -- random --, therefor.
In Column 43, Line 21, in Claim 15, delete "first random" and insert -- random --, therefor.

Signed and Sealed this
Tenth Day of February, 2026

John A. Squires
*Director of the United States Patent and Trademark Office*